US010375247B2

(12) United States Patent
Demmitt et al.

(10) Patent No.: US 10,375,247 B2
(45) Date of Patent: Aug. 6, 2019

(54) SYSTEM AND METHOD FOR DELIVERY OF VOICEMAILS TO HANDHELD DEVICES

(71) Applicant: TVG, LLC, Beaverton, OR (US)

(72) Inventors: Michael Demmitt, Mountain View, CA (US); Amit Manna, Palo Alto, CA (US); Michael Smith, Palo Alto, CA (US); Luis Arellano, Redwood City, CA (US); Chris Pedregal, Stanford, CA (US); Mike LeBeau, Palo Alto, CA (US); Brian Salomaki, Mountain View, CA (US)

(73) Assignee: TVG, LLC, Beaverton, OR (US)

( * ) Notice: Subject to any disclaimer, the term of this patent is extended or adjusted under 35 U.S.C. 154(b) by 0 days.

(21) Appl. No.: 15/070,671

(22) Filed: Mar. 15, 2016

(65) Prior Publication Data
US 2016/0227039 A1 Aug. 4, 2016

Related U.S. Application Data

(63) Continuation of application No. 14/144,439, filed on Dec. 30, 2013, now Pat. No. 9,344,574, which is a
(Continued)

(51) Int. Cl.
*H04M 11/00* (2006.01)
*H04M 3/533* (2006.01)
(Continued)

(52) U.S. Cl.
CPC ........ *H04M 3/533* (2013.01); *G06Q 30/0267* (2013.01); *G10L 15/265* (2013.01);
(Continued)

(58) Field of Classification Search
CPC ......... H04M 3/533; H04W 4/12; H04W 4/14; G10L 15/26
(Continued)

(56) References Cited

U.S. PATENT DOCUMENTS 4,023,643 A 5/1977 Bagley, Jr.
4,136,510 A 1/1979 Crawford et al.
(Continued)

FOREIGN PATENT DOCUMENTS

EP 1280326 7/2001
EP 1379061 6/2003
(Continued)

OTHER PUBLICATIONS

U.S. Appl. No. 11/972,610, filed Jan. 10, 2008, 87 pages.
(Continued)

*Primary Examiner* — Van D Huynh
(74) *Attorney, Agent, or Firm* — Berkeley Law & Technology Group, LLP

(57) ABSTRACT

Briefly, a variety of embodiments, including the following, are described: a system embodiment and methods that allow random access to voice messages, in contrast to sequential access in existing system embodiments; a system embodiment and methods that allow for the optional use of voice recognition to enhance usability; and a system embodiment and methods that apply to the area of voicemail.

24 Claims, 16 Drawing Sheets

Related U.S. Application Data continuation of application No. 11/972,610, filed on Jan. 10, 2008, now Pat. No. 8,644,463.

(60) Provisional application No. 60/884,414, filed on Jan. 10, 2007.

(51) Int. Cl.
*H04M 3/487* (2006.01)
*H04M 3/537* (2006.01)
*G06Q 30/02* (2012.01)
*G10L 15/26* (2006.01)
*H04M 7/12* (2006.01)

(52) U.S. Cl.
CPC ......... *H04M 3/4878* (2013.01); *H04M 3/537* (2013.01); *H04M 3/53333* (2013.01); *H04M 7/12* (2013.01); *H04M 2201/40* (2013.01); *H04M 2203/253* (2013.01)

(58) Field of Classification Search
USPC .......................................... 379/88.14, 88.18
See application file for complete search history.

(56) References Cited

U.S. PATENT DOCUMENTS

| | | | |
|---|---|---|---|
| 5,283,818 A | 2/1994 | Klausner et al. | |
| 5,390,236 A | 2/1995 | Klausner et al. | |
| 5,524,140 A | 6/1996 | Klausner et al. | |
| 5,568,540 A * | 10/1996 | Greco | H04M 1/575 379/88.11 |
| 5,572,576 A | 11/1996 | Klausner et al. | |
| 6,032,039 A | 2/2000 | Kaplan | |
| 6,055,495 A | 4/2000 | Tucker et al. | |
| 6,085,231 A | 7/2000 | Agraharam et al. | |
| 6,116,111 A | 9/2000 | Bürger | |
| 6,333,973 B1 | 12/2001 | Smith et al. | |
| 6,377,822 B1 * | 4/2002 | Grimes | H04M 1/72519 455/412.1 |
| 6,603,838 B1 | 8/2003 | Brown et al. | |
| 6,687,340 B1 | 2/2004 | Goldberg et al. | |
| 6,775,360 B2 | 8/2004 | Davidson et al. | |
| 6,847,959 B1 | 1/2005 | Arrouye et al. | |
| 7,010,100 B1 | 3/2006 | Garg et al. | |
| 7,103,154 B1 * | 9/2006 | Cannon | H04M 1/6505 379/32.01 |
| 8,086,604 B2 | 12/2011 | Arrouye et al. | |
| 8,644,463 B2 | 2/2014 | Demmitt et al. | |
| 9,344,574 B2 | 5/2016 | Demmitt | |
| 2003/0043975 A1 | 3/2003 | Bhogal et al. | |
| 2003/0097262 A1 * | 5/2003 | Nelson | H04M 1/72522 704/235 |
| 2003/0097407 A1 | 5/2003 | Litwin et al. | |
| 2003/0128820 A1 * | 7/2003 | Hirschberg | H04M 3/53333 379/88.14 |
| 2003/0220784 A1 | 11/2003 | Fellenstein et al. | |
| 2004/0048604 A1 | 3/2004 | Idei | |
| 2004/0177122 A1 | 9/2004 | Appelman et al. | |
| 2005/0278545 A1 | 12/2005 | Adams et al. | |
| 2006/0217159 A1 * | 9/2006 | Watson | H04M 1/72522 455/563 |
| 2006/0223502 A1 * | 10/2006 | Doulton | H04L 51/066 455/413 |
| 2007/0078708 A1 | 4/2007 | Yu et al. | |
| 2007/0116204 A1 | 5/2007 | Doulton | |
| 2007/0174258 A1 | 7/2007 | Jones et al. | |
| 2007/0174388 A1 * | 7/2007 | Williams | G06Q 10/107 709/204 |
| 2007/0207785 A1 * | 9/2007 | Chatterjee | H04M 3/53333 455/414.1 |
| 2007/0208563 A1 * | 9/2007 | Rothschild | G10L 15/30 704/235 |
| 2007/0266101 A1 | 11/2007 | Patel et al. | |
| 2007/0274465 A1 | 11/2007 | Othmer | |
| 2008/0112339 A1 | 5/2008 | Armstrong et al. | |
| 2008/0207176 A1 * | 8/2008 | Brackbill | H04M 1/7255 455/413 |

FOREIGN PATENT DOCUMENTS

| | | |
|---|---|---|
| EP | 1599022 | 6/2003 |
| EP | 1755324 | 8/2006 |
| GB | 2376610 | 5/2002 |
| GB | 2422275 | 4/2004 |
| WO | 003993 | 7/2000 |
| WO | 03003765 | 1/2003 |
| WO | 04047415 | 6/2004 |

OTHER PUBLICATIONS

U.S. Appl. No. 11/972,610, filed Mar. 26, 2008, 3 pages.
U.S. Appl No. 11/972,610 Notice to File Missing Parts dated Mar. 26, 2008, 2 pages.
U.S. Appl. No. 11/972,610 Response to Pre-Exam Formalities Notice filed Jun. 26, 2008, 82 pages.
U.S. Appl. No. 11/972,610 Petition for Review by the Office of Petitions filed Jun. 26, 2008, 25 pages.
U.S. Appl. No. 11/972,610 Petition Decision dated Sep. 26, 2008, 2 pages.
U.S. Appl. No. 11/972,610 Petition for Reconsideration, filed Nov. 7, 2008, 100 pages.
U.S. Appl. No. 11/972,610 Petition decision routed to OIPE to act on decision to continue, dated Jan. 27, 2009, 1 page.
U.S. Appl. No. 11/972,610 Filing Receipt filed Feb. 25, 2009, 3 pages.
U.S. Appl. No. 11/972,610 Notice of Publication, dated Jun. 4, 2009, 1 page.
U.S. Appl. No. 11/972,610 Examiner's Search strategy and results dated Mar. 14, 2011, 1 page.
U.S. Appl. No. 11/972,610 Examiner's search strategy and results dated Apr. 1, 2011, 5 pages.
U.S. Appl. No. 11/972,610 Non-Final Rejection dated Apr. 1, 2011, 12 pages.
U.S. Appl. No. 11/972,610 Amendment/Req. Reconsideration After Non-Final Rejection filed Aug. 5, 2011, 19 pages.
U.S. Appl. No. 11/972,610 Examiner's search strategy and results dated Dec. 22, 2011, 8 pages.
U.S. Appl. No. 11/972,610 Non-Final Rejection dated Dec. 22, 2011, 15 pages.
U.S. Appl. No. 11/972,610 Amendment/Req. Reconsideration After Non-Final Rejection filed May 22, 2012, 21 pages.
U.S. Appl. No. 11/972,610 Examiner's search strategy and results dated Sep. 20, 2012, 15 pages.
U.S. Appl. No. 11/972,610 Final Rejection, dated Sep. 20, 2012, 21 pages.
U.S. Appl. No. 11/972,610 RCE and Amendments filed Jan. 2, 2013, 30 pages.
U.S. Appl. No. 11/972,610 Examiner's search strategy and results dated Sep. 25, 2013.
U.S. Appl. No. 11/972,610 Examiner-Initiated interview summary dated Sep. 25, 2013, 1 page.
U.S. Appl. No. 11/972,610 Notice of Allowance and Fees Due dated Sep. 25, 2013, 11 pages.
U.S. Appl. No. 11/972,610 Post Allowance Communication filed Dec. 26, 2013, 3 pages.
U.S. Appl. No. 11/972,610 Issue fee Payment filed Dec. 26, 2013, 2 pages.
U.S. Appl. No. 11/972,610 Issue Notification dated Jan. 15, 2014, 1 page.
U.S. Appl. No. 14/144,439 Application as filed Dec. 30, 2013, 83 pages.
U.S. Appl. No. 14/144,439 Filing Receipt, filed Jan. 15, 2014, 3 pages.
U.S. Appl. No. 14/144,439 Notice to File Missing Parts, Jan. 15, 2014, 3 pages.

(56) References Cited

OTHER PUBLICATIONS

U.S. Appl. No. 14/144,439 Applicant Response to Pre-Exam Formalities Notice, dated Mar. 17, 2014, 18 pages.
U.S. Appl. No. 14/144,439 Filing Receipt, filed Mar. 21, 2014, 3 pages.
U.S. Appl. No. 14/144,439 Preliminary Amendment, dated Jun. 23, 2014, 9 pages.
U.S. Appl. No. 14/144,439 Notice of Publication, filed Jul. 3, 2014, 1 page.
U.S. Appl. No. 14/144,439 Request for Corrected Filing Receipt, filed Nov. 19, 2014, 10 pages.
U.S. Appl. No. 14/144,439 Requirement for Restriction/Election, dated Nov. 25, 2014, 7 pages.
U.S. Appl. No. 14/144,439 Response to Election/Restriction, dated Jan. 26, 2015, 8 pages.
U.S. Appl. No. 14/144,439 Non-Final Rejection, dated Feb. 5, 2015, 16 pages.
U.S. Appl. No. 14/144,439 Amendment/Req. Reconsideration-After Non-Final Rejection, dated May 5, 2015, 9 pages.
U.S. Appl. No. 14/144,439 Electronic Terminal Disclaimer-Approved, filed May 27, 2015, 1 page.
U.S. Appl. No. 14/144,439 Electronic Terminal Disclaimer-Filed, filed May 27, 2015, 2 pages.
U.S. Appl. No. 14/144,439 Non-Final Rejection and Examiner Search, dated Jul. 6, 2015, 16 pages.
U.S. Appl. No. 14/144,439 Amendment/Req. Reconsideration-After Non-Final Rejection, dated Oct. 6, 2015, 15 pages.
U.S. Appl. No. 14/144,439 Notice of Allowance and Fees, dated Jan. 13, 2016, 12 pages.
U.S. Appl. No. 14/144,439 Notice of Allowance and Fees, dated Jan. 27, 2016, 2 pages.
U.S. Appl. No. 14/144,439 Issue Fee Payment and Amendment after NOA, dated Mar. 22, 2016, 4 pages.

\* cited by examiner

Figure 4: Detailed View of Message Inbox

Figure 5: Message Inbox Search Process

Figure 6: Cross-Linking of Audio and Text Representation of Message

Figure 7: New Message/Reply to a message screen

Example System Embodiment

Example System
Embodiment

FIG. 11 Example Output Device Embodiment

Example Output Device Embodiment

Example Ad Message Server Embodiment

Example Output
Device Embodiment

Example Ad Message Server Embodiment

SYSTEM AND METHOD FOR DELIVERY OF VOICEMAILS TO HANDHELD DEVICES

FIELD

This disclosure relates to systems and/or methods for delivery of voicemails to handheld devices.

BACKGROUND

Existing approaches to voicemail delivery and processing have poor usability, lack functionality, and have poor human-computer interaction design. More recent system embodiments have added functionality and addressed some aspects of the usability drawbacks, but they have not addressed the fundamental usability limitations and there remains room for improvement.

Current approaches assume either voice-only access or a full-fledged e-mail application. Voice-only access is the primary reason for the current limitations of existing voicemail system embodiments. Service delivery through voice means that access to stored messages and other interactions may not be random and must be sequential, leading to a cumbersome method of navigating through a voicemail message list and difficulty selecting individual messages. In addition, the limited interface provides limited access to commands and help functions, with the end result that many users are not aware of or know how to use additional functionality, such as replaying messages or accessing caller information.

Access through a full-fledged email application or via current online interfaces may require that the recipient of the message have physical access to a computer to access messages. This requirement makes the messages inaccessible if the recipient is mobile and unable to access a computer.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
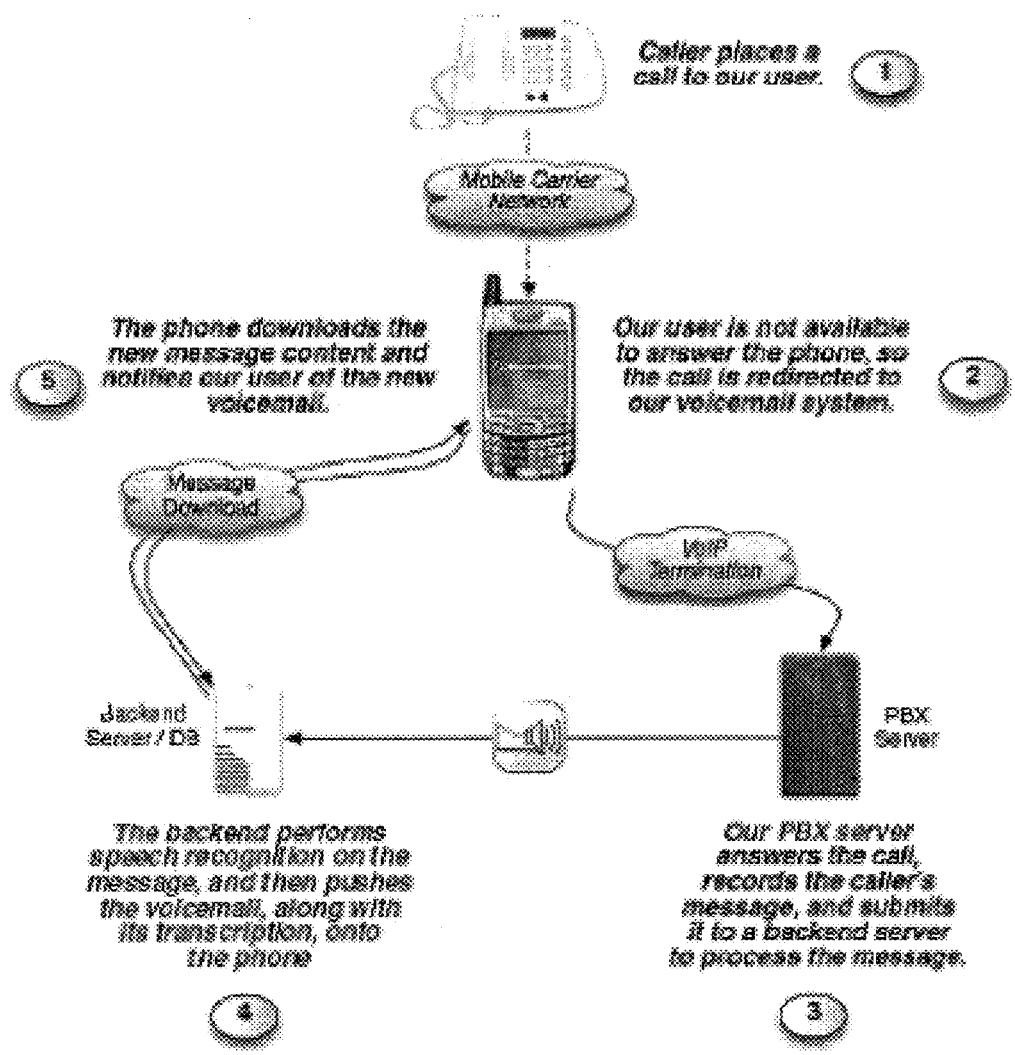
FIG. 1 is a flow diagram of an embodiment.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's memories, registers, and/or other information storage, transmission, and/or display devices.

This application describes a voicemail service that addresses the limitations of existing system embodiments. One or more embodiments have combined advancements in telephony, mobile devices, speech recognition and communications system embodiments in a novel way to offer an improved experience in voicemail system embodiments. In one embodiment, for example, a service delivers voicemails to a user's handset or other similar device, complete with transcriptions. The user accesses his or her messages through an email-like inbox, and has the option to sort or search for messages. The user may pick any individual message to view. If the individual message is opened, the user may see a system embodiment transcription of the message. The audio recording of the voicemail may also be attached and/or linked, either on the handset or the server, and may also be available for the user to listen to. The audio and the text components may be indexed to one another so that the user may navigate to specific parts of the message via either mechanism. Of course, additional embodiments are also disclosed below.

Please see FIG. 1, High-Level Process Flow of System embodiment, for a high-level overview of how a system embodiment works.

In this embodiment, callers to a user of a system embodiment may be forwarded to the user's voicemail inbox if the user is not available. A system embodiment may record the caller's message and forward it to a transcription service. The transcription service may transcribe the voicemail message into text. A delivery service may package the voicemail audio, text and caller information for delivery. A client running on the user's mobile handset or other similar device may either query a system embodiment for new voicemails, or may be notified that a new voicemail has been received. After notification or awareness of a new message, the client may download the voicemail and make it available for the user to view, listen and/or reply from a novel graphical user interface.

The user may also enjoy various mechanisms to respond to the message. They may have the ability to forward the message to another individual, who may or may not be on a system embodiment. They may have the ability to respond using a voice message they record on their handset or other similar device. A system embodiment may also let the user initiate a conversation, allowing them to record voice messages for delivery to themselves (as notes), to another individual, or to a specified group.

1.1. Visual Interface to Voicemail System Embodiment

The core of this particular embodiment is a change in the access method from voice to a visual interface. The user may be able to navigate and access their messages using point and click mechanisms, similar to their existing experiences with web pages and email clients. This allows users to select messages of interest and access them in a random-access manner and not have to navigate through any prior messages to gain access. The transcription of the message from voice to text allows the user to read the message instead of hearing it, thereby opening up many more social situations and locations where checking of the messages is acceptable. Further, the display of a particular voicemail in a visual interface allows for many more and different options to access commands around that voicemail. For example, the user may be able to fast forward the message as it's playing by pressing a button indicated on the screen, rather than having to navigate away from the message to hear a list of relevant commands recited, as happens now under current system embodiments. The visual display also means that the user may see relevant content, such as caller number, call time, etc, at once instead of hearing them sequentially or via special commands.

1.1.1. Voicemail Inbox

The voicemail inbox is the central access point for current voicemail messages in this embodiment. It presents a list of the messages and mechanisms for the user to navigate among them. The application may be running either on a mobile handset or other similar device or inside a web browser, among other devices and/or system embodiments.

1.1.1.1. Listing Voicemails

A system embodiment includes functionality to display current voicemail messages in a list format. A record displayed includes data including but not limited to date, time, caller and a selection of the transcribed message text as an aid for navigation and identification of the message. A record may also contain an indicator of status information, such as but not limited to "New", "Read" and "Responded".

Figure 4:
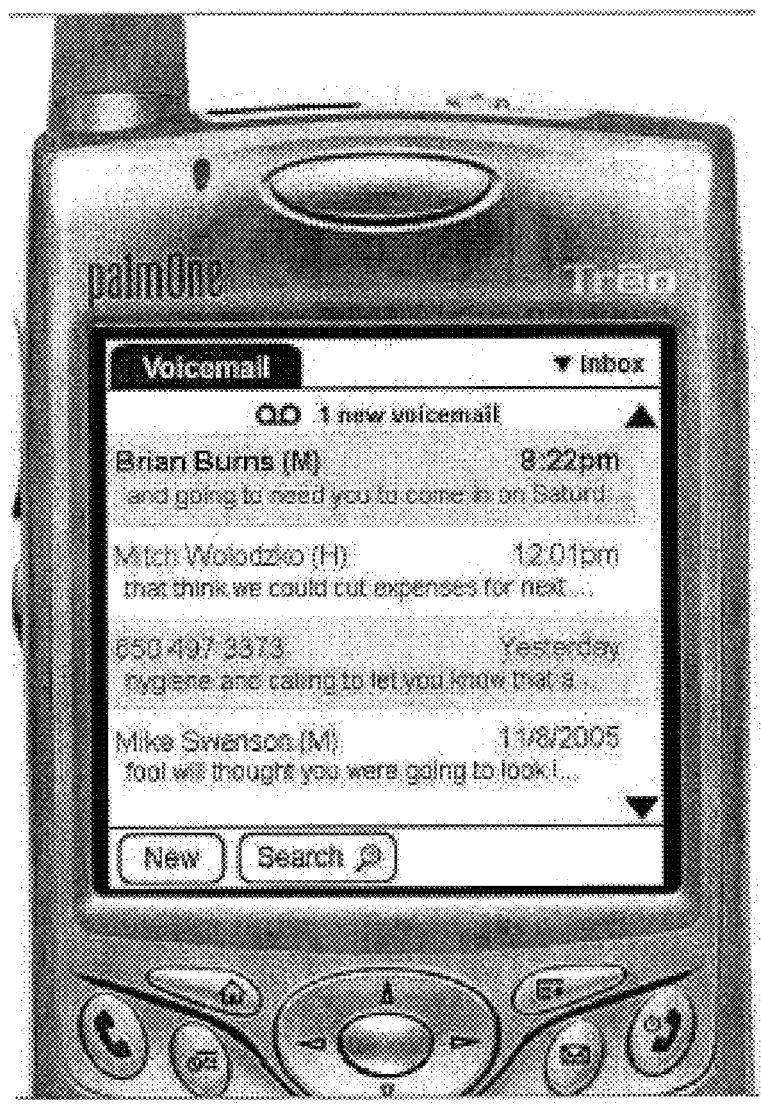
FIG. 4 is a schematic diagram showing a detailed view of an inbox for a possible embodiment.

Please see FIG. 4: Detailed View of Message Inbox for one example of the message inbox.

1.1.1.2. Searching Voicemails

A system embodiment includes functionality to search through current voicemail messages. The user has the ability to enter search criteria and receive a list of messages whose transcriptions match the specified criteria. The user may also search fields including but not limited to name, date and message type.

Figure 5:
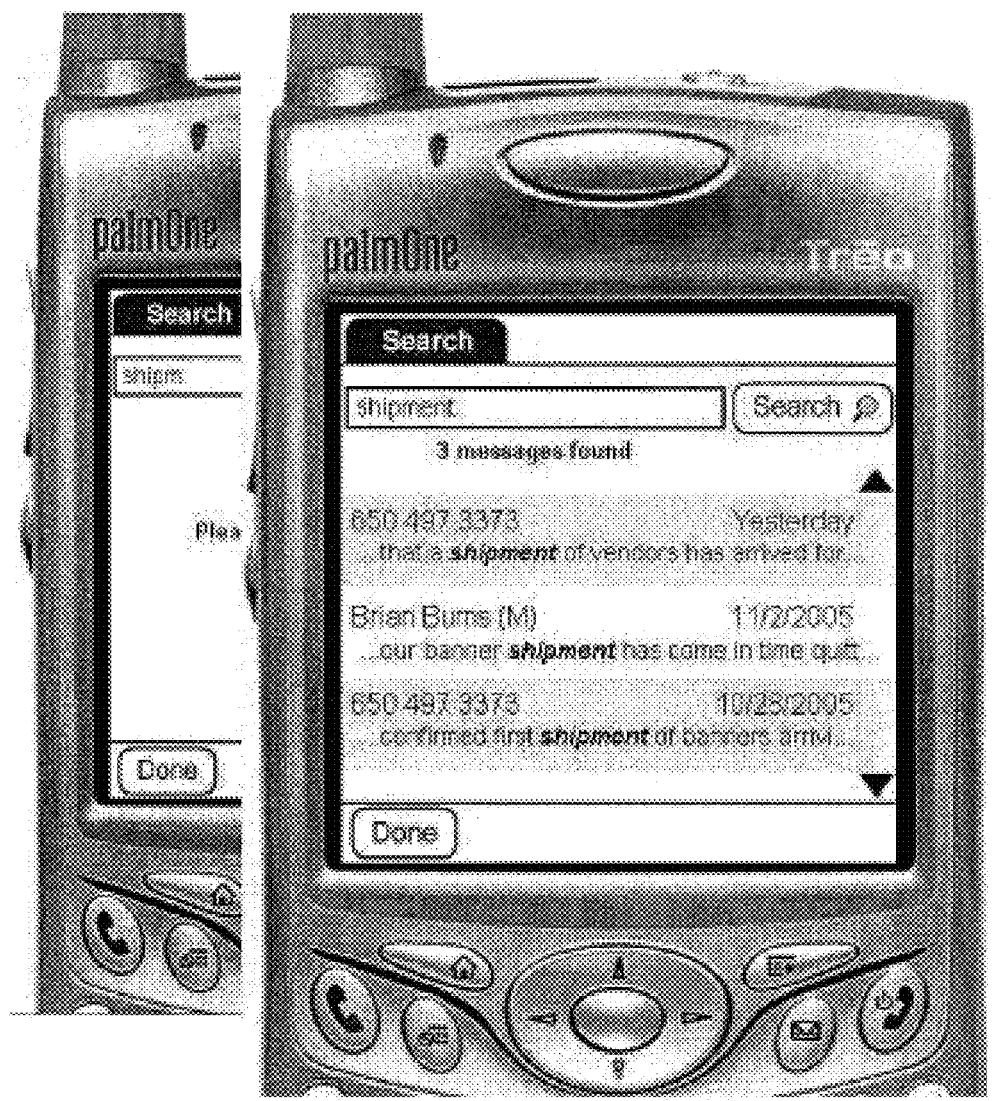
FIG. 5 is a schematic diagram showing a detailed view of an inbox search process for a possible embodiment.

Please see FIG. 5: Message Inbox Search Process for a graphical representation of the search process.

1.1.1.2.1. Sorting Results by Specified Criteria

Search results may be sorted via predefined criteria. The user may specify which criteria they wish to sort by and a system embodiment may reorder the results based on the criteria and a predefined sort order.

1.1.1.2.1.1. Embodiment: Sort Search Results by Date/Time Received

One embodiment allows the user to sort search results based on the time that the voicemail is received. The user may select time of message from the list of possible criteria and a system embodiment may reorder the messages according to when they were received, earliest to latest.

1.1.2. Individual Voicemail Message View

If an individual voicemail has been selected by the user, a system embodiment displays the message in its own visual representation. This visual representation includes details on the caller and the message, as well as the actual content of the message itself. It displays the transcribed text of the message, and provides access to the audio recording of the voicemail. It also provides controls where the user may manage playback of the message as well as respond. The user manages playback by turning audio playback on or off, fast forwarding or rewinding to certain portions, or otherwise using the navigation mechanisms to navigate around the content of the message. The user may respond by using the response mechanisms to perform such actions as forward to another number, forward to email, reply to an individual, and reply to a group or call the sender. The response may also include voice and/or text from the responder.

1.1.2.1. Navigation

A system embodiment offers a visual method for users to navigate the content of the individual message.

1.1.2.1.1. Correlating Audio to Text Transcription

A system embodiment creates an alternate representation of the message content as text. This means that the message is now in at least two formats: text and the original audio. To improve the user experience, the two formats may cross-index and synchronize to one another.

Figure 6:
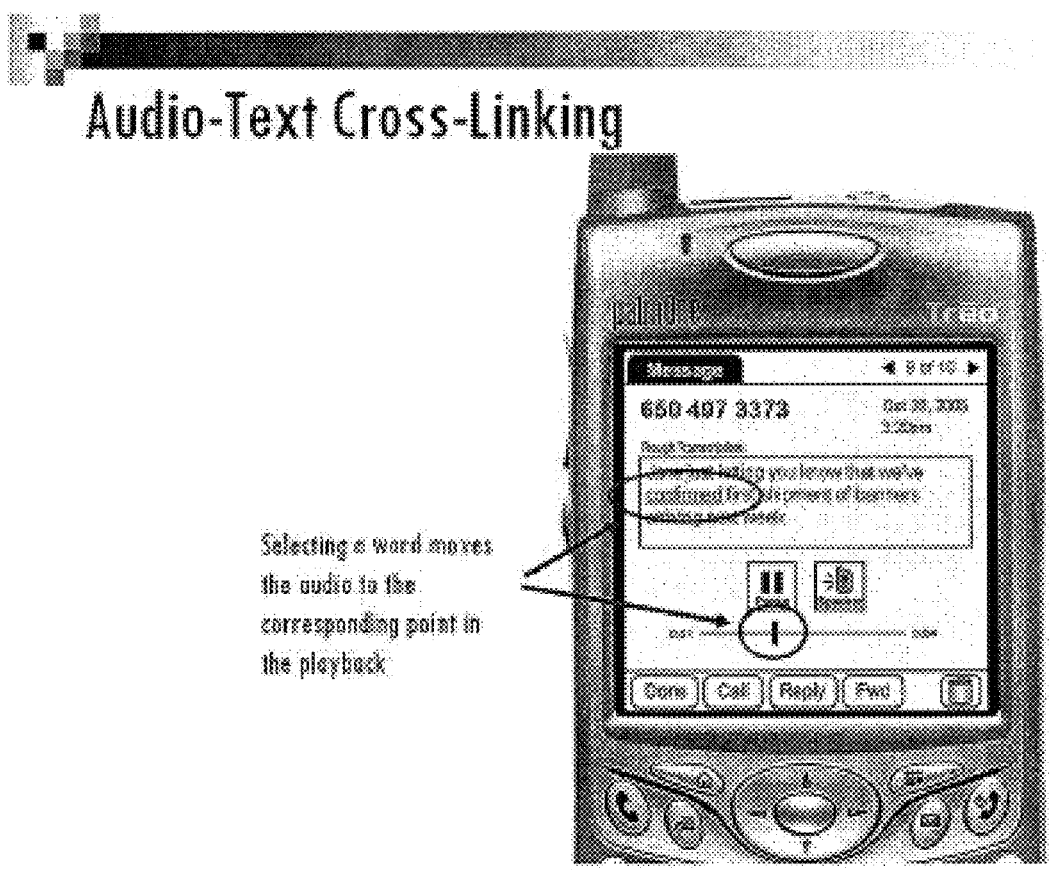
FIG. 6 is a schematic diagram showing crossing linking of audio and text messages for a possible embodiment.

Please see FIG. 6: Cross-Linking of Audio and Text Representation of Message for a graphical representation of how the two formats are linked.

1.1.2.1.2. Accessing a Particular Point in Audio Through Text Selection

The user may select any word in the text and a system embodiment may automatically move to the corresponding point in the audio and begin message playback from that point.

1.1.2.1.3. Accessing a Particular Point in Text Through Audio Selection

The user may select any point in the audio playback and a system embodiment may automatically move to the corresponding point in the text. To do this the user may use but is not limited to a slider-bar or buttons on the interface or on the handset or other similar device.

1.1.2.1.4. Replaying a Snippet of Audio by Selecting a Word or Phrase in the Text The user may select any word or phrase in the text and a system embodiment may play just the snippet of audio corresponding to that word or phrase.

1.1.2.2. Enabling Response by Transforming Telephone Number Text Into Link

A system embodiment recognizes telephone numbers in the transcription of the message and automatically creates a link from that number. Selection of the link by the user initiates a call to the referenced number. Likewise, this concept may be extended to initiate other communications other than by telephone number.

1.1.2.3. Enabling Response by Transforming Identifiers in Text Into Link

A system embodiment may recognize identifiers, such as names, in the transcription of the message and automatically create a link from that identification. Names or other identifiers may be looked up from a user's handset address book or be included in the message if it is generated on the backend. Selection of the link by the user initiates a call to the referenced number.

1.1.2.4. Enabling Easy Addition of Phone Numbers to Phone Book

A system embodiment recognizes telephone numbers in the transcription of the message and provides an option for the user to add numbers in the message to their on-phone phone book. The user may also correct this number in their phone book and that change is reflected in the transcription.

1.1.3. Ability to Navigate to Individual Voicemail After Notification of New Voicemail A system embodiment includes notifications that a new message has been left while the user is not using a provided service. The user may bypass the inbox and navigate to the new voicemail by taking an action on the notification display.

1.1.3.1. Embodiment: User May View Voicemail Immediately by Clicking on Notification One embodiment of this mechanism is providing the user a link along with the notification of a new voicemail. The user may click the link, which may take them to the individual voicemail view for that particular voicemail. The nature of the link is determined by the phone's interface.

1.2. Notification of New Voicemails

One of the more difficult problems to solve in providing this service is how the handset or other similar device may recognize that a new message has been received. Since the message is first received at a centralized system embodiment and the handset or other similar device is by nature mobile and only occasionally connected, it becomes a challenge to keep the two system embodiments synchronized.

This application describes several mechanisms by which the handset or other similar device may recognize the availability of new voicemails.

1.2.1. Polling Mechanism

One mechanism to check for new voicemails is to periodically query a system embodiment. Under this mechanism, the handset or other similar device may initiate a connection to a system embodiment, submit identifying information and receive as a response the availability and number of new messages. Regardless of whether or not new messages have been received, the handset or other similar device may wait a predetermined amount of time and perform a query process again. This may happen indefinitely.

1.2.2. Event-Triggered Checking

The mobile handset or other similar device may be set to query the main message system embodiment based on certain trigger events. Examples of such events include: missed phone call, entry into coverage area from an area with no coverage, power-on of the phone, etc.

1.2.2.1. Within a Specified Time Window After a Missed Call

If the user receives notification of a missed call, the handset or other similar device may wait a predetermined amount of time and may perform a query to check for new voicemails. It may be desirable to wait a minimum amount of time to allow the caller to record his message and to allow for processing time of the recorded message on a system embodiment. If the predetermined amount of time has been met or exceeded, the handset or other similar device may perform the query to check for new voicemails.

1.2.2.2. If the Handset or Other Similar Device Enters a Service Area

A user may not receive a call if he or she is out of a coverage service area. Furthermore, the query may not be completed without service. However, callers to the user may still leave voicemails at the centralized system embodiment. As such, if the handset or other similar device again enters into a service coverage area, there exists the possibility that a voicemail may be waiting. The handset or other similar device may thus initiate a query call upon or relatively soon after entering a service coverage area.

1.2.2.3. If the Handset or Other Similar Device is Turned On

A user may not receive a call if his or her handset or other similar device is not turned on. Furthermore, the query may not be completed without the handset or other similar device being on. However, callers to the user may still leave voicemails at the centralized system embodiment. As such, if the handset or other similar device is turned on, there exists the possibility that a voicemail may be waiting. The handset or other similar device may thus initiate a query call upon or relatively soon after being turned on.

1.2.3. Push Notifications

Another mechanism is for a system embodiment to actively notify the handset or other similar device that a new message is waiting. As soon as a system embodiment has finished processing a new voicemail message, it may notify the handset or other similar device, which may initiate a query call to retrieve the new voicemail. Any of several message formats and delivery channels may be used to deliver this notification from a system embodiment to the handset or other similar device.

1.2.3.1. Receipt of Specially-Formatted SMS

One option of channel and format is for a system embodiment to send a specially-formatted SMS to the handset or other similar device. If a new voicemail has been received and processed on a system embodiment, a system embodiment may send the SMS to the handset or other similar device. The SMS is in a special format that the handset or other similar device recognizes. If an SMS is received, the handset or other similar device may examine it to see if it is a new voicemail notification. If so, the handset or other similar device may initiate a query call to a system embodiment to retrieve the new voicemail(s).

1.2.3.2. Receipt of Specially-Formatted Push Email

Another option of channel and format is for a system embodiment to send a specially-formatted push email to the handset or other similar device. If a new voicemail has been received and processed on a system embodiment, a system embodiment may send the email to the handset or other similar device. The email is in a special format that the handset or other similar device recognizes. If an email is received, the handset or other similar device may examine it to see if it is a new voicemail notification. If so, the handset or other similar device may initiate a query call to a system embodiment to retrieve the new voicemail(s). Note that this mechanism relies on a "push" email from a system embodiment to the handset or other similar device, not on the "pull" system embodiment of traditional email which the handset or other similar device may have separately.

1.2.4. Combination of Any of the Above Methods

The above sections define individual methods of having the handset or other similar device gain knowledge of a new voicemail. In addition to the individual methods, a combination of the different methods may be used to reduce the number of query calls to a system embodiment while providing an improved experience for the user.

1.2.4.1. Conditional Push Notifications

One variation of the Push Notification mechanism above which may be effectively combined with other methods is a conditional push notification. A conditional push notification may be combined with methods such as event-triggering and polling to achieve prompter notifications and greater coverage than either method alone.

1.2.4.2. Embodiment: Combining Event-Triggered Checking with Polling to Increase Effectiveness One possible embodiment of such a combination of methods is combining event-triggering with polling. Such a combination may address the scenario where the user receives a voicemail but fails to receive a missed call notification on their handset or other similar device. Under this scenario, the polling or event-trigger method may work as before, checking from the handset or other similar device to a system embodiment to see if new messages have arrived. A system embodiment may track how long a new voicemail had been waiting to be delivered. If a new message had been waiting longer than a predetermined time, a system embodiment may proactively send a push notification to the handset or other similar device. A system embodiment may also monitor responses and stop sending push notifications if the new voicemail was not "picked up" within a certain time frame, inferring that the handset or other similar device was either out of coverage or turned off, for example.

1.3. Accessing Multiple Message Inboxes on a Single Client

One embodiment of a system embodiment may allow multiple message inboxes to be accessed from a single client. A telephone number registered on a system embodiment may be linked to an individual inbox. A user may register additional telephone numbers to be checked from a single client. The client may retrieve the messages from the inbox of an individual telephone number and may display them in a combined manner on the user interface.

1.4. Enhancements for Handset or Other Similar Devices with No Data Plan or with No Storage Space The operation of a system embodiment fits well with handset or other similar devices with data plans. However, handset or other similar devices with data plans among consumers are currently in the minority, with most consumers not subscribing to a data plan. To reach the large market of non-data plan users, a system embodiment is able to provide various alternatives to enable handset or other similar devices without a data plan to enjoy aspects of the functionality of a system embodiment.

1.4.1. Delivery of Voicemails via Push Messaging

One approach employed by a system embodiment to deliver voicemail messages to handset or other similar devices without data plans is the use of push messaging. A system embodiment may push the content of the voicemail, including the audio recording and the text transcription, as a message to the handset or other similar device. The handset or other similar device receives the message and the message information is transferred to the visual interface explained above.

One possible embodiment of this concept may use premium MMS to deliver the message content to the handset or other similar device. The client on the handset or other similar device may detect the receipt of the MMS and display the delivered message through the user interface.

1.4.2. Accessing a Particular Voicemail Through a Unique Telephone Number

A system embodiment may also enable operation on handset or other similar devices without a data plan via the use of SMS and the use of a pool of centralized, assigned telephone numbers for voicemails. In this mode of operation, a system embodiment may deliver the transcription of the response as a text message (SMS) but may not include the audio of the response. Instead, a voicemail is linked to a single telephone number from a pool of telephone numbers on the backend. The handset or other similar device may dial in to that number. Many voicemails may be linked to any one particular back-end telephone number, but only one voicemail per user might be linked to any single backend number. The back-end may determine who is calling that number through the use of callerID and may retrieve and play the voicemail linked to that combination of caller ID and backend telephone number.

Figure 2:
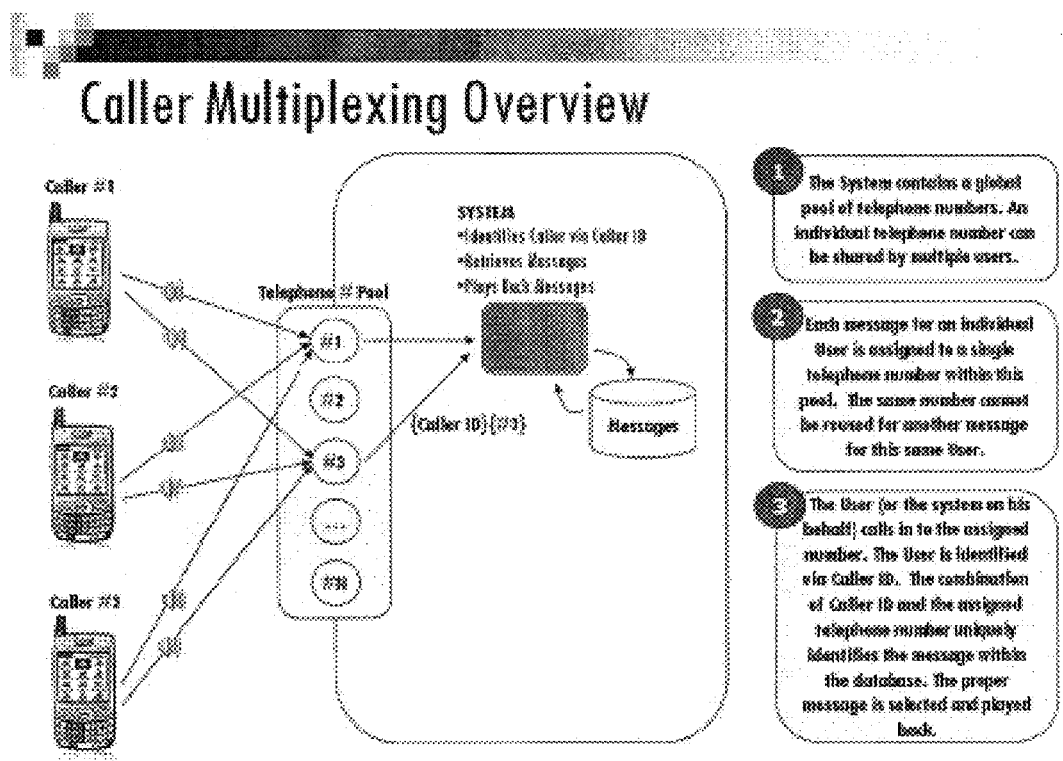
FIG. 2 is a schematic diagram of an embodiment using telephone number.

Please see FIG. 2, Use of System embodiment Telephone Numbers and User Telephone Number to Identify Messages, for a graphical representation of how this process works.

1.4.3. Ability to Navigate to Individual Voicemail Through Touch Tones

Another system embodiment enhancement to allow delivery of the service to non-data plan phones is the navigation of individual voicemails through touch tones. Under this mode of operation, a system embodiment provides the visual voicemail inbox, but access to individual messages is achieved through automatic touch tone input from a system embodiment. The user may view the voicemail inbox on their handset or other similar device. A system embodiment assigns an integer number to a voicemail. If the user clicks on a particular voicemail, the handset or other similar device may initiate a phone call to a number specific to the message to access the audio of the message. If the call is connected, the user may control audio playback by sending touch tones or predefined audio clips to the backend.

The backend identifies the specified voicemail through the touch tones. It retrieves the corresponding voicemail and plays back the audio recording over the cellular connection.

1.4.4. Ability to Navigate to Individual Voicemail Through PreDefined Audio Clips Another system embodiment enhancement to allow delivery of the service to non-data plan phones is the navigation of individual voicemails through predefined audio clips. Under this mode of operation, a system embodiment provides the visual voicemail inbox, but access to individual messages is achieved through predefined audio clips from a system embodiment. The user may view the voicemail inbox on their handset or other similar device. A system embodiment assigns an integer number to a voicemail. If the user clicks on a particular voicemail, a system embodiment may send the index of the voicemail selected as predefined audio clips to the backend. The backend identifies the specified voicemail through the predefined audio clips. It retrieves the corresponding voicemail and plays back the audio recording over the cellular connection. Likewise, in some embodiments an audio clip may include tones or DTMF codes.

1.5. Ability to Specify Mixed Access Methods for a User's Messages

A system embodiment allows the user to receive messages through several mediums. For example, a user may specify their messages be delivered to a telephone number and to an email address. Upon or soon after delivery of a message, a system embodiment may select the appropriate message format and delivery mechanism for that delivery channel. For telephone numbers, system embodiment messages or SMS mechanisms may be used. For email addresses, the message may be sent formatted as an email, with the body containing the text and the audio file of the message included as an attachment or it may provide a link to a web interface containing that information as well.

1.6. Authentication

A voicemail comprises a personal communication from one person to another. As such, care is taken by a system embodiment so that the message is protected and unauthorized access is not imprudently granted.

1.6.1. Usage of Voice as Password

One method used by a system embodiment to authenticate a user is to use their voice as a password. A system embodiment may identify the user based on their voice and may match that identification to a previously-stored identification on a system embodiment. If there is a match, the user is granted access to the stored messages on a system embodiment. If the voice does not match, the user is denied access and an alert is reported by a system embodiment.

1.6.1.1. Recognition of Spoken Pass Phrase

A system embodiment may also provide another layer of security by allowing the user to speak their pass phrase. If the pass phrase does not match the pass phrase stored in a system embodiment, a system embodiment may refuse authorization.

1.6.2. Counteract Telephone Number Spoofing

A system embodiment relies on the telephone number of the caller to identify him or her. However, this may expose a system embodiment to security threats since it is possible to falsify CallerID information and thus present a false telephone number. A system embodiment may take several measures to mitigate this risk.

1.6.2.1. Require Password

A system embodiment may employ a password of any user on a system embodiment prior to granting access to the user's messages. If the password given matches the stored password, access is granted. If the password given does not match, the user is denied access and an alert is reported by a system embodiment.

1.6.2.2. Provide a Large-Enough Pool of Telephone Numbers Such that it is Difficult to Guess Correct Combination of Call-In Telephone Number and User Telephone Number Section #3.3.2, "Accessing a Particular Voicemail Through a Unique Telephone Number", describes a mechanism whereby users with non-data plan handset or other similar devices may access individual voicemails through a pool of back-end telephone numbers. It may be theoretically possible for a malicious attacker to guess the combination of user telephone number and the call-in telephone number, thereby gaining access to the voicemail. To combat this, the pool of telephone numbers may be increased so as to increase the difficulty an attacker may have in attempting to match telephone numbers.

This type of attack may be fairly efficient if the quantity of call-in numbers is low. As the quantity increases, the probability of this type of attack succeeding falls. A system embodiment also detects a certain number of failed matches and may take action, such as refusing to accept connections from the spoofed number for a period of time.

Likewise, an audio clip may, in another embodiment, be sent from the application to authenticate the phone. Also, the phone may be programmed to dial a number, and issue a sequence of DTMF codes after the other side picks up. Thus, one may build an authentication system embodiment along these lines as well.

1.6.2.3. Usage of Autication Via Audio Clip Sent from Application

A system embodiment may also authenticate the handset or other similar device from which the call is received through the use of an audio clip. The client on the handset or other similar device may dial a number, and if the server responds to the call, the client may play an audio clip to be authenticated. The server may either use the audio clip itself or data contained within the audio clip to identify the handset or other similar device and grant access.

1.6.2.4. Usage of Autication Via DTMF Codes Sent from Application

A system embodiment may also authenticate the handset or other similar device from which the call is received through the use of DTMF codes (e.g., TouchTones). The client on the handset or other similar device may dial a number, and if the server responds to the call, the client may play DTMF codes to be authenticated. The server may use the DTMF codes themselves or data contained within the audio clip to identify the handset or other similar device and grant access.

1.7. Voicereply

The user may have various options to reply to a received voicemail. One of these options is the ability to speak a response, which is captured by a system embodiment, transcribed, and sent to the original caller. A user may receive a Voicereply in their inbox as they may any regular message, except it may be differentiated by a visual marker or by some other method.

Figure 7:
FIG. 7 is a schematic diagram showing a detailed view of a reply to message screen for a possible embodiment.
Figure 8:
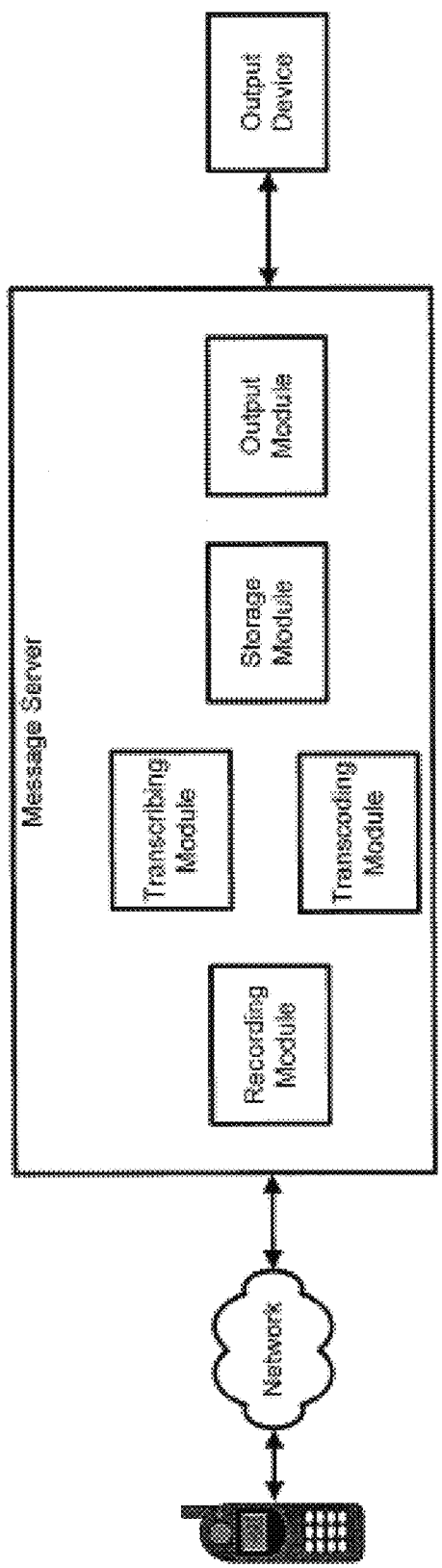
FIG. 8 is a schematic diagram showing a message server embodiment.
Figure 9:
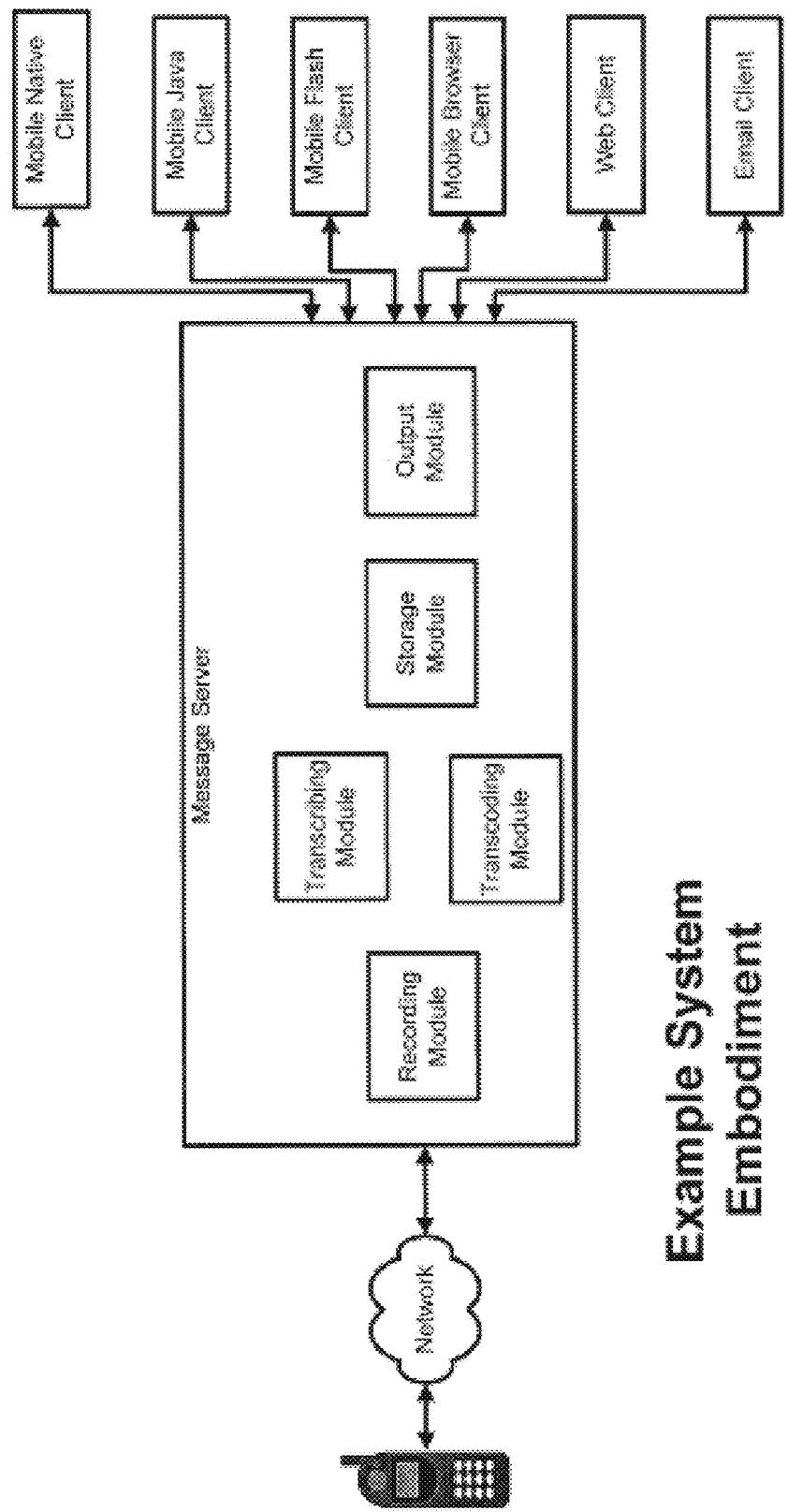
FIG. 9 is a schematic diagram showing a system embodiment.
Figure 10:
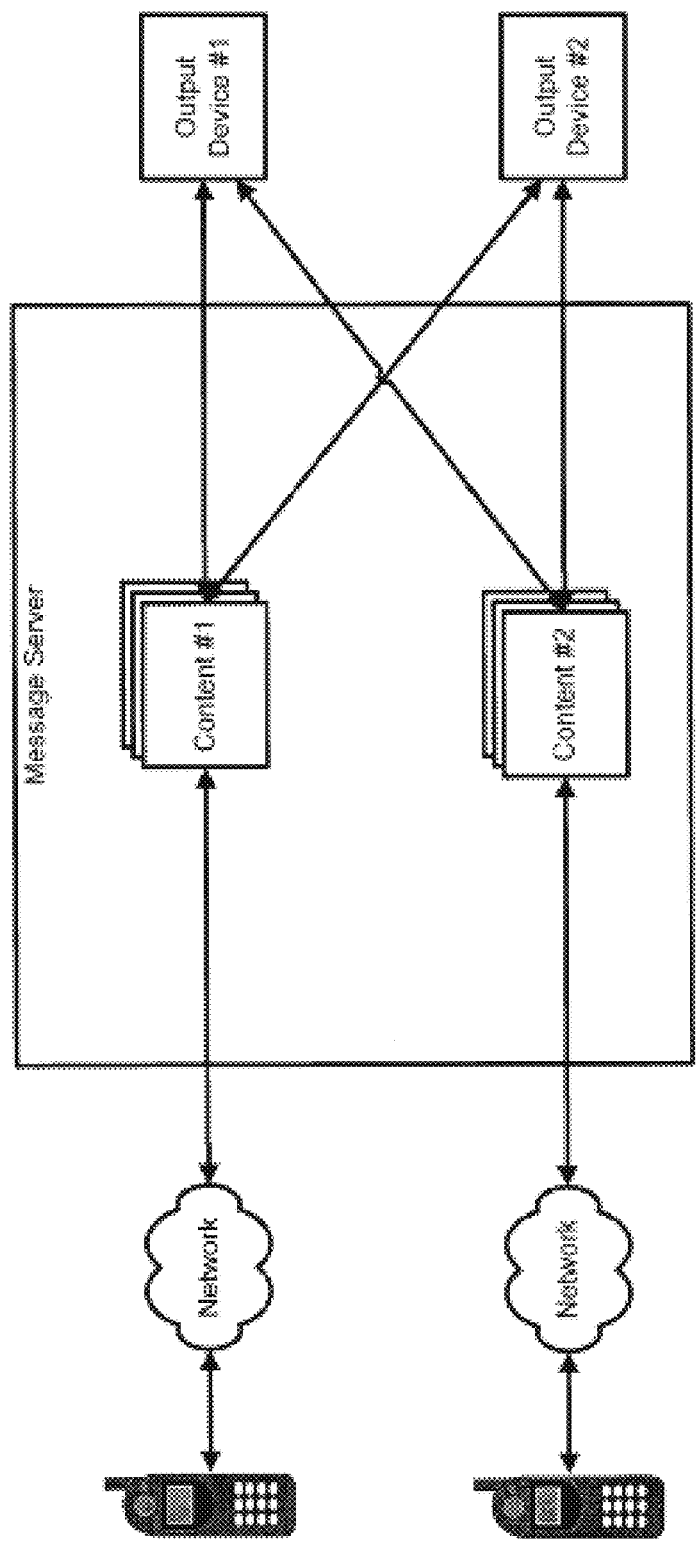
FIG. 10 is another schematic diagram showing a system embodiment.
Figure 11:
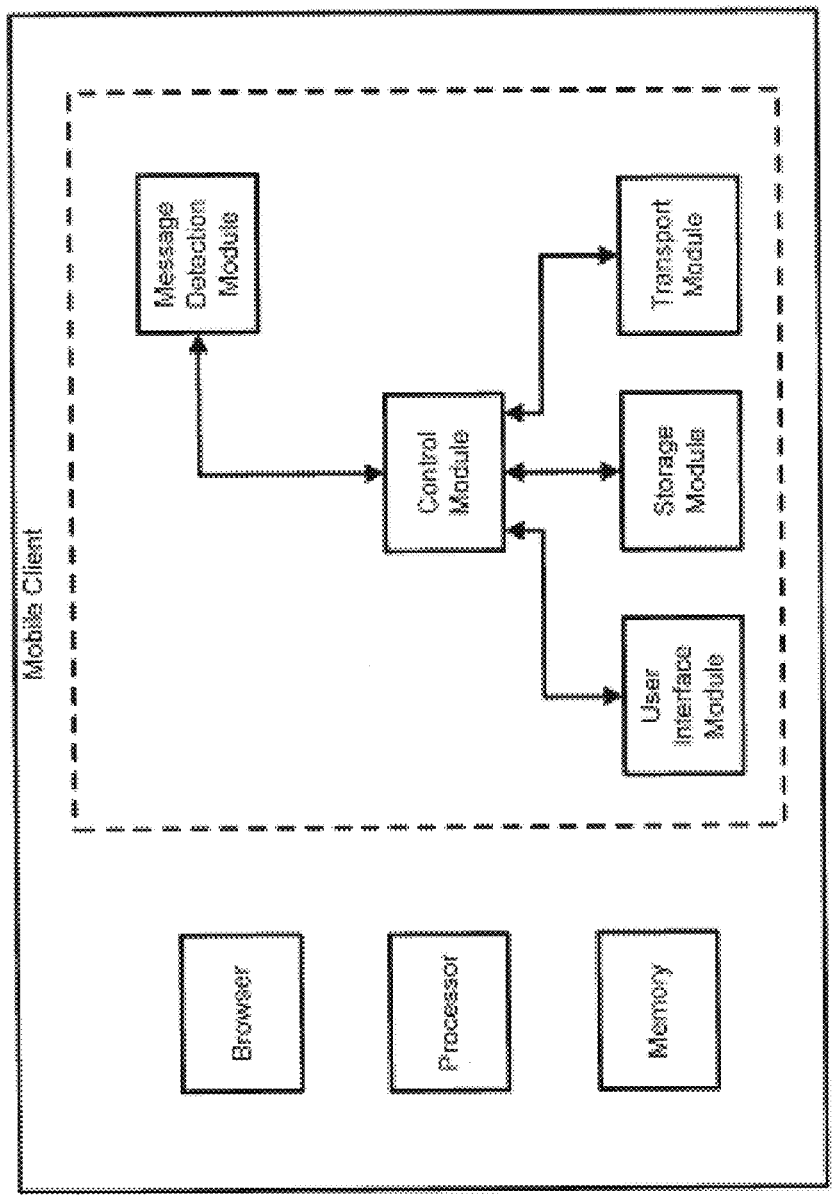
FIG. 11 is a schematic diagram showing an output device embodiment.
Figure 12:
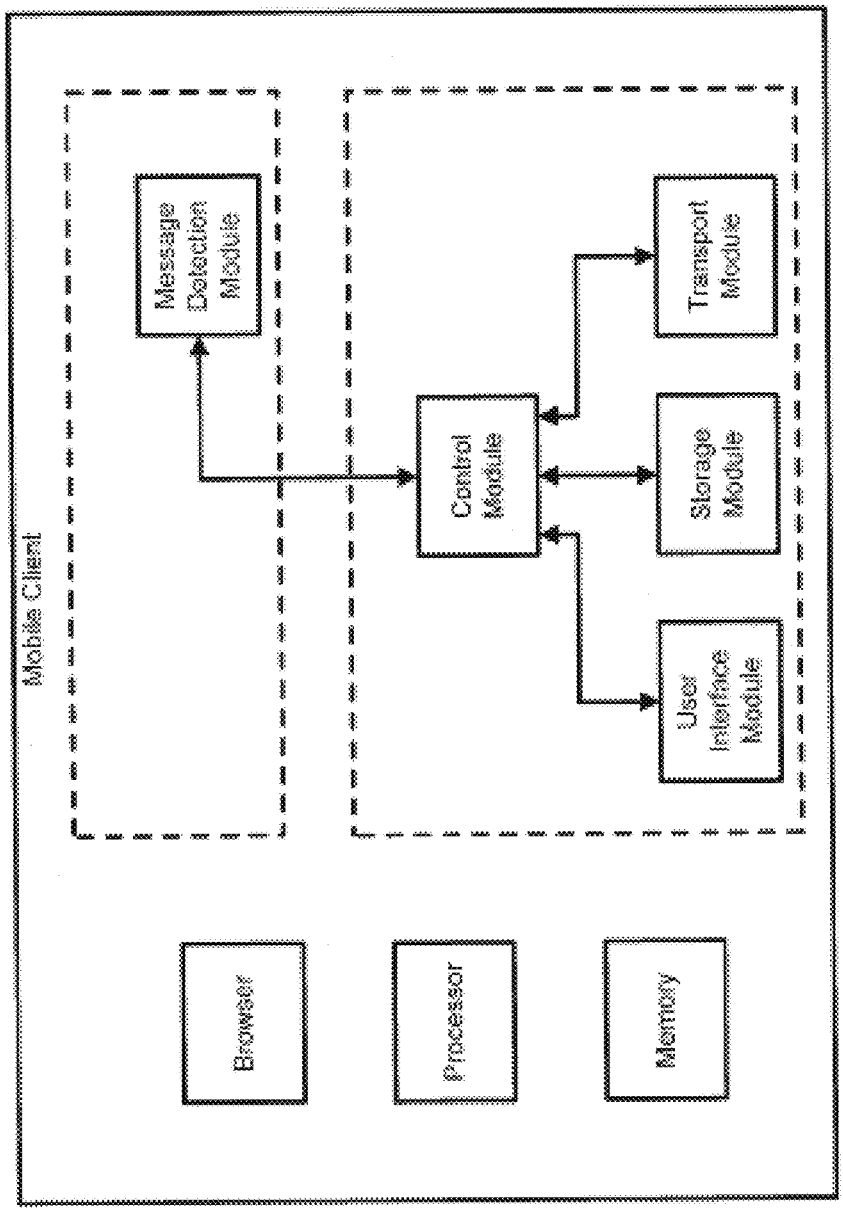
FIG. 12 is a schematic diagram showing another output device embodiment.
Figure 13:
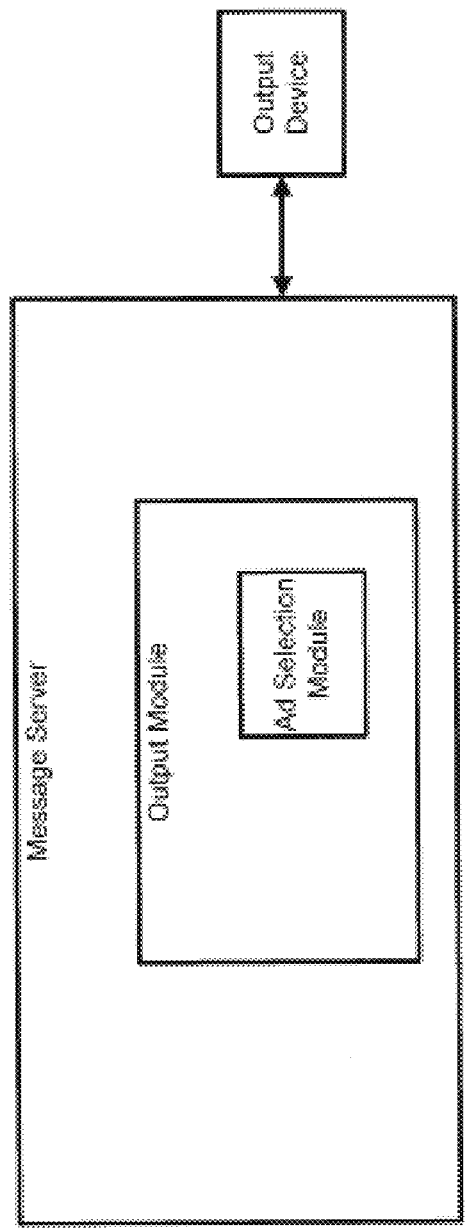
FIG. 13 is a schematic diagram showing an ad message server embodiment.
Figure 14:
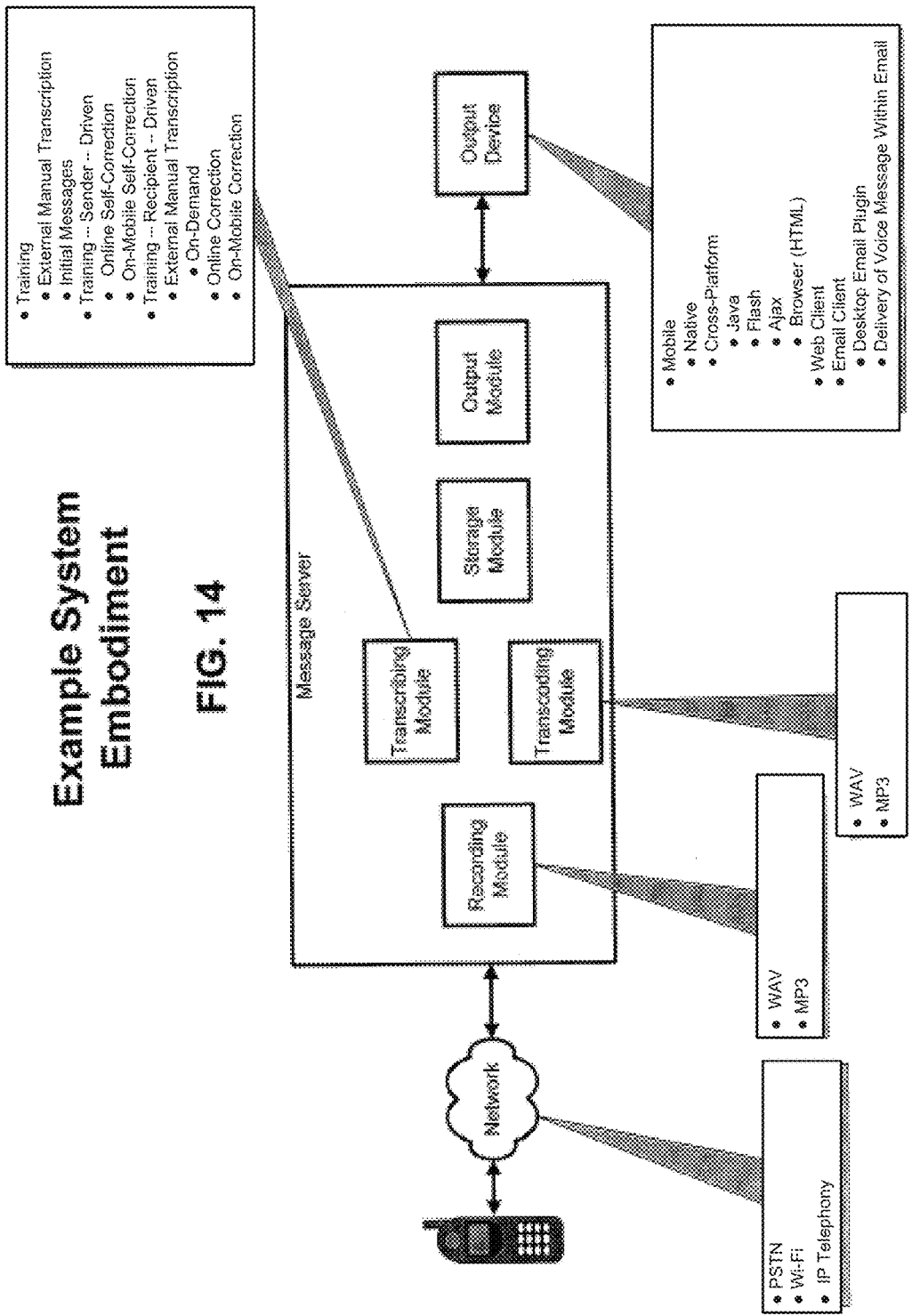
FIG. 14 is a schematic diagram showing another system embodiment.
Figure 15:
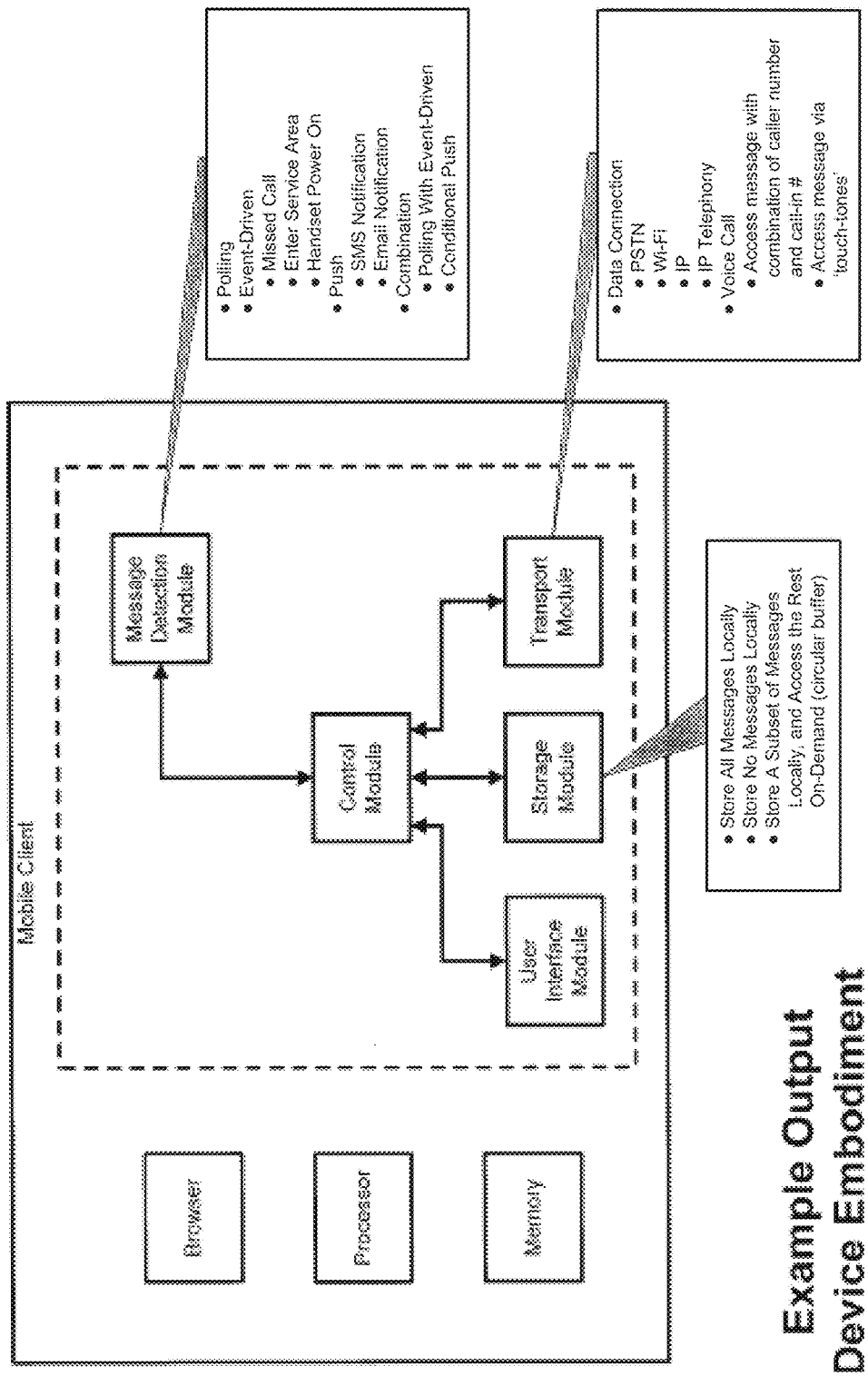
FIG. 15 is a schematic diagram showing another output device embodiment.
Figure 16:
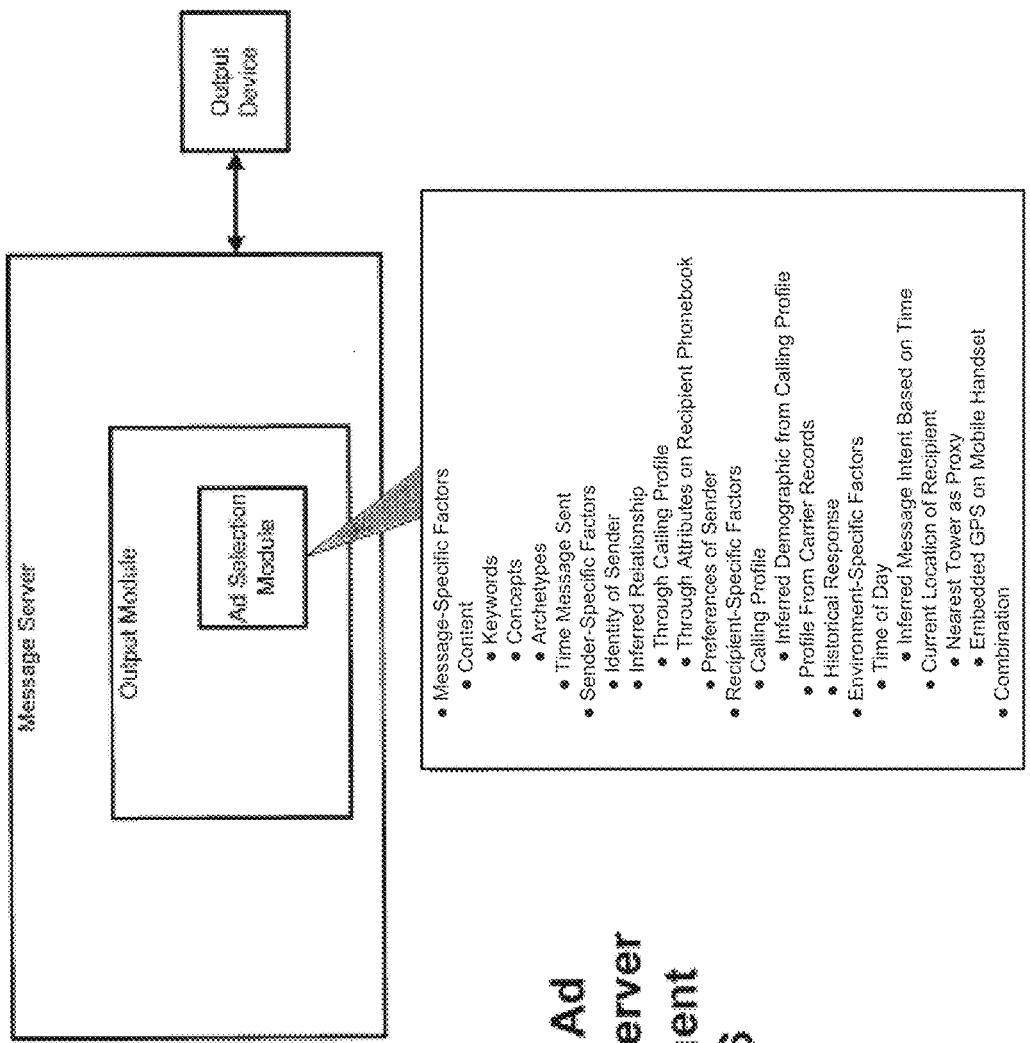
FIG. 16 is a schematic diagram showing another ad message server embodiment.

Please see FIG. 7: New Message/Reply to message screen for a graphical representation of the reply process.

1.7.1. Ability to Record and Deliver a Message

A system embodiment provides a mechanism for the user to record a voice response to a message. The message is recorded on the handset or other similar device or on a system embodiment. If recorded, the user specifies one or more recipients for the message. A system embodiment may transcribe the message into text, and deliver the message to the specified recipients. The format of the delivered message may depend on whether or not the recipient is a system embodiment user.

1.7.1.1. Embodiment: Record a Message for Asynchronous Delivery to Another Recipient One possible embodiment of such a VoiceReply system embodiment is the recording of a message for asynchronous delivery to another recipient. Under this embodiment, the user initiates a recording through an action in the application. The recording is made on a system embodiment through a cellular connection. If finished recording, the user enters in a telephone number, or selects a contact from his or her contact address book. A system embodiment transcribes the message and prepares it for delivery. If the recipient is a system embodiment user, the message may be delivered as a voicemail message. If the recipient is not a system embodiment user, the message may be delivered as an SMS with the message audio available via a call-in number, as described Section #3.3.2 Accessing a Particular Voicemail Through a Unique Telephone Number.

1.7.2. Users of System Embodiment

A certain portion of original callers may be system embodiment users themselves. For these users, the VoiceReply may appear as any other system embodiment-delivered message may, in their inbox.

1.7.2.1. Identify Responses to Earlier Voicemail

In the inbox of the original caller who is a system embodiment user, the VoiceReply may be differentiated to distinguish them from other types of voicemail messages. In addition, if the VoiceReply is sent to the system user who left the original message, the original message may be linked to the response or otherwise indicated.

1.7.3. Non-Users of System Embodiment

A far larger portion of original callers may be non-system embodiment users, at least based on current information. For these users, different techniques are employed so that the VoiceReply is accessible on most handset or other similar devices, and so that value-added features of a system embodiment are still accessible.

1.7.3.1. Access a Particular Reply Through a Unique Telephone Number

A system embodiment may not be able to deliver the message in the same manner to the handset or other similar device of a non-system embodiment user. For these users a system embodiment may deliver the message as specified above in Section #3.3.2, "Accessing a Particular Voicemail Through a Unique Telephone Number".

1.7.3.2. Provide a One-Time Use Password to Retrieve Reply

In addition to a telephone number used to access the audio of the VoiceReply, a system embodiment may also protect the message using a password, such as a one-time, disposable password. The one-time password is assigned if the message is created and delivered to a non-system embodiment recipient. The recipient may use this one-time password as authentication to access the message if calling in. If the password matches that assigned to the message, access is granted. If the password does not match, the request for access is rejected.

1.7.3.2.1. Embodiment: Non-User Receives SMS Notification of Reply with Embedded Link and One-Time Password One possible embodiment of such a method is the use of passwords, such as one-time passwords, to secure a VoiceReply where the user is notified via an SMS. The user may receive the SMS with the name and number of the responder, as well as the transcribed text of the reply. The SMS contains a link to the stored audio of the reply. Embedded within that link is the telephone number assigned to the message. The SMS also contains the password generated by a system embodiment for that message. If calling in, a system embodiment may prompt the user to enter the password to listen to the audio.

1.7.4. Ability to Specify Multiple Recipients for Delivery of VoiceReply

A system embodiment provides for multiple recipients of a VoiceReply. A recipient may have the message delivered to them in a format that may be accessible to them.

1.7.5. Ability to Specify Recipients in Mixed Delivery Channels

A system embodiment allows users to specify different delivery channels for the recipients of their voice replies. For example, a user may specify that a message be delivered to a telephone number and to an email address. A system embodiment may select the appropriate message format and delivery mechanism for that delivery channel. For telephone numbers, system embodiment messages or SMS mechanisms may be used. For email addresses, the message may be sent formatted as an email, with the body containing the text and the audio file of the message included as an attachment.

1.7.6. Inclusion of a Link on a Voicereply from a User to a Non-User

On Voicereplies sent to a non-user of a system embodiment, there may be a link, such as on the bottom of the SMS or MMS Voicereply. This link may point to the system website or allow the user to download a copy of the application software to their mobile phone or other device. In this case, the URL starts the application download; special headers sent in the URL request allow the appropriate application version for that platform to be downloaded.

1.8. Voicenote

A user also has the option to initiate a message for delivery to himself, another individual or group. The user may have the ability to speak a message, which is captured by a system embodiment, transcribed, and sent to the specified recipients. An alternative implementation may allow the user to capture the audio stream of a phone conversation on their phone or other device. The method of delivery may be through a system embodiment, as an SMS, as an MMS, or via email. A user may receive a Voicenote in their inbox as they may any regular message, except it may be differentiated by a visual marker or via some other method.

Please see FIG. 7: New Message/Reply to message screen for a graphical representation of the Voicenote creation process.

1.8.1. Ability to Record and Deliver a Message

A system embodiment provides a mechanism for the user to record a message. The message is recorded on the handset or on the back-end system embodiment. If recorded, the user specifies one or more recipients for the message. A system embodiment may transcribe the message into text, and deliver the message to the specified recipients. The format of the delivered message may depend on whether or not the recipient is a system embodiment user.

1.8.1.1. Embodiment: Record a Message for Asynchronous Delivery to Another Recipient One possible embodiment of such a VoiceNote embodiment is the recording of a message for asynchronous delivery to another recipient. Under this embodiment, the user initiates a recording through an action in the application. The recording is made on a system embodiment through a cellular connection. If finished recording, the user enters in a telephone number, or selects a contact from his or her contact address book. A system embodiment transcribes the message and prepares it for delivery. If the recipient is a system embodiment user, the message may be delivered as a voicemail message. In the inbox, the message may be marked as a VoiceNote using colors, text or some other visual symbol or other approach to differentiate it from other types of messages. If the recipient is not a system embodiment user, the message may be delivered as an SMS with the message audio available via a call-in number, as described above.

1.8.1.2. Embodiment: Record a Message for Asynchronous Delivery to Yourself Another possible embodiment of such a VoiceNote embodiment is the recording of a message for asynchronous delivery to the user themselves. Under this embodiment, the user initiates a recording through an action in the application. The recording is created on a system embodiment through a cellular connection. If finished recording, the user indicates that the message is for him or her. A system embodiment transcribes the message and prepares it for delivery. The message is delivered as a voicemail message. In the inbox, the message may be marked as a VoiceNote using colors, text or some other visual symbol or other approach to differentiate it from other types of messages.

1.8.2. Users of System Embodiment May Receive Voicenotes

Since the person receiving the note is a system embodiment user, the VoiceNote may appear as any other system embodiment-delivered message may, in their inbox.

1.8.3. Users of System Embodiment May Send Voicenotes to their Own Inbox

By specifying themselves as the recipient of a Voicenote users may send themselves Voicenotes.

1.8.3.1. Embodiment: Capturing a 411 Phone Conversation

The user dials 411. They ask for the phone number for a take-out restaurant. They navigate to the system and start recording the conversation as a new Voicenote. If the conversation is done the note is sent down to the server, transcribed and placed in the user's voicemail box. The user has the record of the phone number and may use the click-to-call feature, mentioned previously, to call the restaurant.

1.8.4. Non-Users of System Embodiment

A far larger portion of recipients, based on current information, may be individuals who are not currently system embodiment users, and who may thus not have a client installed on their handsets or other device. For these users, different techniques are employed so that the VoiceNote is accessible on most devices, and so that value-added features of a system embodiment are still accessible.

1.8.4.1. Access a Particular VoiceNote Through a Unique Telephone Number

A system embodiment may not be able to deliver the message in the same manner to the handset or other similar device of a non-system embodiment user. For these users a system embodiment may deliver the message as specified above in Section #3.3.2, "Accessing a Particular Voicemail Through a Unique Telephone Number".

1.8.4.2. Require a Password to Retrieve Reply

In addition to the telephone number used to access the audio of the VoiceNote, a system embodiment may also protect the message using a password. The password may be a one-time password. The password may be assigned if the message is created and delivered to a non-system embodiment recipient.

The recipient may use this password as authentication to access the message upon or soon after calling in. If the password matches that assigned to the message, access is granted. If the password does not match, the request for access is rejected.

1.8.4.2.1. Embodiment: Non-User Receives SMS Notification of Reply with Embedded Link and One-Time Password One possible embodiment of such a method is the use of passwords to secure a VoiceNote where the user is notified via an SMS. The user may receive the SMS with the name and number of the responder, as well as the transcribed text of the reply. The SMS contains a link to the stored audio of the reply. Embedded within that link is the telephone number assigned to the message. The SMS also contains thee password generated by a system embodiment for that message. If calling in, a system embodiment may prompt the user to enter the password to listen to the audio.

1.8.4.3. Inclusion of a Link on a Voicenote from a User to a Non-User

If Voicenotes are sent to a non-user of a system embodiment, there may be a link, such as on the bottom of the Voicenote. This link may point to the system website or allow the user to download a copy of the application software to their mobile phone or other device. In the case that the URL starts the application download, special headers sent in the URL request allow the appropriate application version for that platform to be downloaded.

1.8.5. Ability to Specify Multiple Recipients for Delivery of VoiceNote

A system embodiment provides for multiple recipients of a VoiceNote. A recipient may have the message delivered to them in a format that may be accessible to them.

1.8.6. Ability to Specify Recipients in Mixed Delivery Channels

A system embodiment provides for recipients in different delivery channels to be specified. For example, a user may specify that a message be delivered to a telephone number and to an email address. A system embodiment may select the appropriate message format and delivery mechanism for that delivery channel. For telephone numbers, system embodiment messages or SMS mechanisms may be used. For email addresses, the message may be sent formatted as an email, with the body containing the text and the audio file of the message included as an attachment.

1.8.7. Attachments

Converting voicemails to other message formats enables the service to attach other items to the message. Any number of additional items may be attached, by a system embodiment or by the user.

1.8.8. Ability to Include Attachments in VoiceNote or VoiceReply

One logical place to include attachments is in the VoiceNote or VoiceReply message. Attachments may be included with the original content. Of course, this is simply an example embodiment.

1.8.8.1. Embodiment: Include Document as Attachment to VoiceReply

One possible embodiment of such a system embodiment may allow the user to attach a document already present on the handset or other device as an attachment to a VoiceReply. A scenario may be envisioned where the user receives a voicemail from another individual asking them for a document. The recipient may initiate a VoiceReply, but add the requested document as an attachment to the response.

1.9. Viral Marketing

Voicemails lend themselves well to marketing. A system embodiment may include several features that facilitate the spread of the handset or other device client through person to person methods.

1.9.1. Ability to Invite a Non-User

A system embodiment includes the ability to invite a non-user of a system embodiment onto a system embodiment. A current user may specify the contact information for a non-user, and a system embodiment may send the invited user a notification that allows them to enroll in a system embodiment.

1.9.1.1. Embodiment: Invite a Friend

One possible embodiment of this functionality is a feature that allows a current user to invite another, such as a "friend," onto a system embodiment. The current user may select the "Invite a Friend" or other link on the application. The application displays a prewritten, preformatted text message. This message may be sent to the invited friend, for example. The original user is allowed to edit and customize the message. If finished, the original user may press "Invite". At that point, a system embodiment may send the invited friend a notification text message with a link and instructions on how to enroll. The invitee may download the application and enroll in the service entirely or partially through the mobile handset or other device.

1.9.2. Ability to Sign Up Entirely on a Handset or Other Similar Device

To facilitate sign ups of potential new users, a system embodiment may allow new users to enroll via their handsets or similar devices without the necessity of a more complex platform, such as a computer, for example. Data collection, interaction and notifications may be done via such devices and the new user may be able to complete the registration process without moving to a more complex device. 1.9.3. Link Included on Every VoiceReply A system embodiment may include a link to sign up for the service on voice messages sent in response to a previous voice message received by a user of the service. The outbound voice message may include a link to sign up somewhere within the message reply. The recipient of the reply may have the opportunity to click on the link, at which point they may commence the enrollment process.

1.9.4. Link Included on Every VoiceNote

A system embodiment may include a link to sign up for the service on voice messages sent by a user of the service. The outbound voice message may include a link to sign up somewhere within the message content. The recipient of the reply may have the opportunity to click on the link, at which point they may commence the enrollment process.

1.10. Delivery of Voicemails Via Alternate Channels

Specifically, a system embodiment may deliver the messages to channels other than a handset or similar handheld devices. People may prefer to receive messages in their current working environment. A system embodiment's centralized receipt and storage of messages allows the message to be sent out over various delivery channels.

1.10.1. Plugin for Desktop Email Clients

One delivery channel for voicemail messages are desktop email clients. A system embodiment may include a plugin to desktop email clients which may perform similar functions as the handset or other handheld device with regards to checking, listing and displaying messages.

1.10.1.1. Embodiment: Plugin for Microsoft Outlook

One possible embodiment of such a system embodiment is a plugin for Microsoft Outlook. This plugin may integrate received voicemail messages seamlessly with standard received email. It may perform the functions of checking, listing, and displaying messages.

1.10.2. Plugin for Mobile Email Clients

Another delivery channel for voicemail messages are in mobile email clients. A system embodiment may include a plugin to mobile email clients which may perform similar functions as the standard application with respect to checking, listing and displaying message 1.10.3. Delivery Through Email System Embodiments In addition to the plugin mechanism described above, voicemail messages may also be delivered as embedded objects or links within standard emails. The user may receive the email and may activate the embedded object or click on the link to open the voicemail. The message may be replayed within the email message itself, or within a new webpage opened from the email message.

1.10.3.1. Embodiment: Delivery of Voicemails to Online Email Services

One possible embodiment of such a system embodiment is embedding a link to the voicemail message stored on a system embodiment in an email sent to the user. The user clicks on the link, which opens a new webpage with the voicemail message embedded within it. The user clicks on specified controls to play, rewind or fast-forward the message. The user also may view the message transcription on this page and interact with the audio and the transcription as discussed in section 3.1.2.1 "Navigation."

1.10.4. Delivery Through Instant Messaging System Embodiments

Another delivery channel for voicemail messages are instant messaging system embodiments. A system embodiment may include a plugin to IM clients which may perform similar functions as a handset or similar handheld device with regards to checking, listing and displaying messages. A system embodiment may also deliver the voicemail message through the IM channel, treating it as an Instant Message itself, for example. A system embodiment may also use the built-in capabilities of an IM client to deliver the message, such as using any integration with audio speakers to play the audio portion of the message.

1.10.4.1. Embodiment: Plugin for IM Clients

One possible embodiment of such a system embodiment is a plugin for IM clients such as Yahoo Messenger. This plugin may integrate received voicemail messages seamlessly with standard received Ns. It may perform the functions of checking, listing, and displaying messages.

2. Speech Recognition

A system embodiment makes use of speech recognition, especially in the area of transcribing the content of the voicemail to text. A system embodiment contains various novel applications of speech recognition, as well as methods to enhance the accuracy of the speech recognition.

2.1. Provision of Speech Recognition as a Network-Centric Service

A system embodiment represents a novel delivery of speech recognition services as a network-centric service. The speech recognition functionality resides on a network and makes its functionality accessible through interfaces into and out of a system embodiment. A system embodiment receives audio input on its input interface. It determines the format of audio input and identifies the correct handler for the determined format. A system embodiment also determines the speech to text engine to use to convert the speech to text, as determined via a system embodiment configuration, and invokes that engine to convert the audio into text. A system embodiment returns the converted text to the calling system embodiment. The speech recognition network service may operate without training, but if training or samples are available, it may make use of them to enhance accuracy.

2.2. Use of Speech Profiles for Individuals Using or Calling Into System Embodiment As a method to improve the accuracy of speech recognition, a system embodiment maintains a speech profile for individuals whose speech is being transcribed. Recordings made by individuals on a system embodiment may be stored and added to their profile to build a set of speech samples for that individual. This set of speech samples may be later used to improve the accuracy and/or efficiency of the speech recognition engine.

2.2.1. Use of Speech Profiles for Individuals Who are Not Current Users of a System Embodiment A system embodiment may maintain speech profiles not only for current users of a system embodiment, but also for individuals external to a system embodiment who call those users. A system embodiment may use these profiles of external individuals to improve the accuracy of the speech recognition in a similar manner that it may use the profiles of the current system embodiment users.

2.3. Identification of Individuals through Speaker Identification

A system embodiment may be able to determine the identity of the caller through the characteristics of their voice. This identification may be used in improving speech recognition, such as automatically retrieving the voice profile for that user.

2.4. Identification of Individuals through Knowledge of which Cell Phone is Being Used A system embodiment may be set up so as to assume that the speaker on a cell phone or similar device is the only one that uses that that device. By this setting, messages arriving from this phone are associated with the cell phone owner's speech profile.

2.5. Training of System Embodiment to Improve Performance

A system embodiment includes features that enable the use of training to improve the accuracy of the speech recognition. The training may be conducted by any of the individuals involved, or by external parties.

2.5.1. Training of System Embodiment by Sender

A system embodiment may allow training by the sender. The sender may specify the correct transcription to captured audio from himself or herself.

2.5.1.1. Embodiment: System Embodiment to Allow Sender to Train System Embodiment by Correcting Errors One possible embodiment of such a system embodiment is a system embodiment that enables the sender to train a system embodiment on recorded audio. For example, the sender may speak their message, wait for a system embodiment to transcribe it, and be presented with the transcription results. The sender may correct any mis-transcribed words. A system embodiment may record the corrections and create an updated model of the sender's speech for use in later transcriptions from the same user.

2.5.2. Training of System Embodiment by Recipient

A system embodiment may allow training by the recipient. The recipient may specify the correct transcription to captured audio from a particular sender.

2.5.2.1. Embodiment: System Embodiment to Allow Recipient to Train System Embodiment by Correcting Errors from Specific Senders One possible embodiment of such a system embodiment is a system embodiment that enables the recipient to train a system embodiment on recorded audio from a particular sender. For example, the sender may speak their message and have it delivered to the user, as with the normal operation of a system embodiment. The user may receive the message, but may have the option to correct any mis-transcribed words. A system embodiment may record the corrections and create an updated model of the sender's speech for use in later transcriptions from the same sender.

2.5.3. Training of System Embodiment via Manual Verification

A system embodiment may allow training via manual correction. Transcribed messages from a particular caller may be routed for manual transcription or for manual correction. The changes may be recorded by a system embodiment and used to enhance the accuracy of speech recognition on messages from that particular sender. A system embodiment training using these manual transcriptions may continue until adding additional transcriptions into a system embodiment may negligibly or otherwise not significantly improve the transcription quality for the speaker, such as through an improvement measure.

2.5.3.1. Embodiment: Use of Transcribers to Train System Embodiment by Correcting Errors One possible embodiment of such a system embodiment is a system embodiment that enables the routing of messages to people who may transcribe it or make corrections in the machine transcription. The sender may speak their message and have it delivered to the user, as with the normal operation of a system embodiment. The user may receive the message. However, the message and transcription may also be sent to a call center where the message transcription may be corrected. A system embodiment may record the corrections and may add them to a model of the sender's voice. A system embodiment may use this model to enhance the accuracy of later messages from the same sender.

2.5.3.2. Embodiment: Use of Transcribers to Train System Embodiment by Direct Transcription Another possible embodiment of such a system embodiment is a system embodiment that enables the routing of messages to people who may transcribe them manually. The sender may speak their message and have it delivered to the user, as with the normal operation of a system embodiment. The user may receive the message. However, the message may also be sent to a call center where employees may transcribe the message manually or where it may be done with a combination of automatic and manual approaches. This may be done by having the employees repeat the message into another speech recognition system embodiment highly trained on their voice and through a high quality microphone. The accurate transcriptions and the original audio may be added to the sender's model to enhance the accuracy of later messages from that sender.

2.5.4. Training of System Embodiment via Web-Based System Embodiment Linked to Recording for Manual Correction A system embodiment may also offer a web-based interface linked to a handset or other similar device for manual correction by a user. The voice is recorded and sent to the backend. The recording may be done on the handset or other similar device and sent to the backend, or the recording may be done on the backend via a cellular connection. The backend performs speech recognition on the recording and displays the transcribed message on the web-based interface, such as, simply as one example, words where the transcriber indicates more than one possibility through special marking. If the user selects those words, such as via an input device, as an example, a mouse click, a list of alternate transcriptions are displayed. The user may correct the transcription by picking an alternate transcription from the list. The user may also correct the transcription by manually editing a single word or phrase.

2.5.5. Training of System Embodiment via Web-Based Interface, Script and Cellular Connection A system embodiment may allow training via a web-based interface and a cellular connection. Traditional systems enable training only via a computer application and a computer microphone. A system embodiment here may provide a mechanism where a web-based interface is used to display a known script to the user. The user's spoken speech is captured via a cellular connection on a handset or similar device, and transcribed with the original script as a known comparison sample. This mechanism does not require the use of any computer microphones or applications, other than a browser, running on the computer.

2.5.5.1. Embodiment: Web-Based Interface and Cellular Connection

One possible embodiment of such a system embodiment is a system embodiment that enables training via a web interface. The web interface displays a known script. The user calls a specified number on his handset or other similar device and starts speaking the known script. The user indicates the completion of a section of text through the use of codes, such as dialing a '9' to indicate the end of a paragraph. This allows for an improved training experience using dynamic text. The audio is recorded on the back-end system embodiment. The audio is transcribed, using the known script as a comparison sample for the transcriber to use in determining the correct transcription.

2.6. Use of Different Sound Capture Quality

Since a system embodiment is able to recognize who is recording the message, several improvements may be made to sound quality and speech transcription. For example, sound recorded on a handset or similar device may be recorded at a higher quality than sound that is recorded through a cellular connection. The higher quality of the recording results in a higher quality transcription.

2.6.1. Embodiment: Record a Message for Asynchronous Delivery to Another Recipient One possible embodiment of using different sound capture quality is the recording of a message for asynchronous delivery to another recipient. Under this embodiment, the user initiates a recording through a command. The recording is made on the handset or similar device and is recorded at a higher quality than may otherwise be available if the recording were made through a cellular connection. If finished recording, the user enters in a telephone number, or selects a contact from his or her contact address book. A system embodiment transcribes the message and prepares it for delivery. If the recipient is a system embodiment user, the message may be delivered as a voicemail message. If the recipient is not a system embodiment user, the message may be delivered as an SMS with the message audio available via a call-in number, as described above.

2.6.2. Embodiment: Record a Message for Asynchronous Delivery to Yourself

Another possible embodiment of using different sound capture quality is the recording of a message for asynchronous delivery to the user themselves. Under this embodiment, the user initiates a recording through an action in the application. The recording is made on the handset or other similar device and is recorded at a higher quality than may otherwise be available. If finished recording, the user indicates that the message is for him or her. A system embodiment transcribes the message and prepares it for delivery. The message is delivered as a voicemail message.

2.6.3. Embodiment: Switch from Leaving a Voicemail to Recording on the Handset or Other Similar Device for System Embodiment Users Another possible embodiment of using different sound capture quality arises if a system embodiment user calls another system embodiment user and is directed to a voicemail system embodiment. Under that case, a system embodiment may detect that the sender is leaving a message and that both the sender and the recipient of a voicemail are system embodiment users. It may switch the sender from leaving a message through a cellular call to having the message be recorded on the handset or other similar device client at a higher sound capture quality level. The recorded message becomes a VoiceNote and gets delivered through the VoiceNote mechanism.

2.6.4. Embodiment: Switch From Leaving a Voicemail to Recording on the Handset or Other Similar Device for All Users Another possible embodiment of using different sound capture quality arises if a system embodiment user calls any telephone number and is directed to a voicemail system embodiment. Under that case, a system embodiment may detect that the caller is leaving a message and switch the sender from leaving a message through a cellular call to having the message be recorded on the handset client or similar device at a higher sound capture quality level. The recorded message becomes a VoiceNote and gets delivered through the VoiceNote mechanism.

2.7. Option to Improve Transcription By Requesting Manual Transcription

A system embodiment may also offer the use of all-manual transcription or a mix of automatic and manual approaches. Users may be able to specify that they wish to receive only manually-transcribed messages or a mix. Senders of messages to these users may be able to leave their voicemail messages as before. However, instead of transcribing the message via the automated system embodiment, the audio is sent to a call center where the message is transcribed manually or via a mix of approaches. If the transcription is complete, the message is delivered to the user through a similar approach as other messages for other users.

3. Advertising

A system embodiment offers advertising to handsets or other similar devices. This advertising is in the context of the delivered voicemail. The advertising may be linked to the delivered voicemail message and/or may be targeted by factors such as user factors or environmental factors. The advertisement may also be untargeted and not selected based on any user or environmental factors. Thus, this embodiment includes the combination of advertising and voicemail on a mobile handset or other similar device. Furthermore, this embodiment includes targeting advertising in the context of voicemail on a mobile handset or other similar device.

3.1. Provide Voicemail Service Free of Cost to Users in Exchange for Advertisement on the Service A system embodiment may offer the service to users who have agreed to receive advertisements with various attractive financial arrangements, including without charge, for example. These advertisements may be in different formats, in different areas, and displayed in different manners.

3.1.1. Banner-Type Ads on Inbox

The handset or other similar device may display banner-type advertisements on the Inbox screen. The advertisement may be displayed in different sections of the screen. The advertising space may also be rotated among at least one placement on the screen.

3.1.2. Banner-Type Ads on Individual Voicemail View

The handset or other similar device may display banner-type advertisements on the individual voicemail view screen. The advertisement may be displayed in different sections of the screen. The advertising space may also be rotated among at least one placement on the screen.

3.1.3. Application "Daily Pass"

The handset or other similar device may display a single advertisement on the first voicemail checked by a user on any given calendar day. Seeing the advertisement allows the user to access the rest of his or her voicemails for that calendar day without having to view additional advertisements.

3.1.4. "Interceptor" Ads on Individual Voicemail View

The handset or other similar device may display advertisements before showing the user an individual voicemail view. The advertisement may be displayed for a short period of time, and may disappear and the selected voicemail message view may be displayed.

Figure 3:
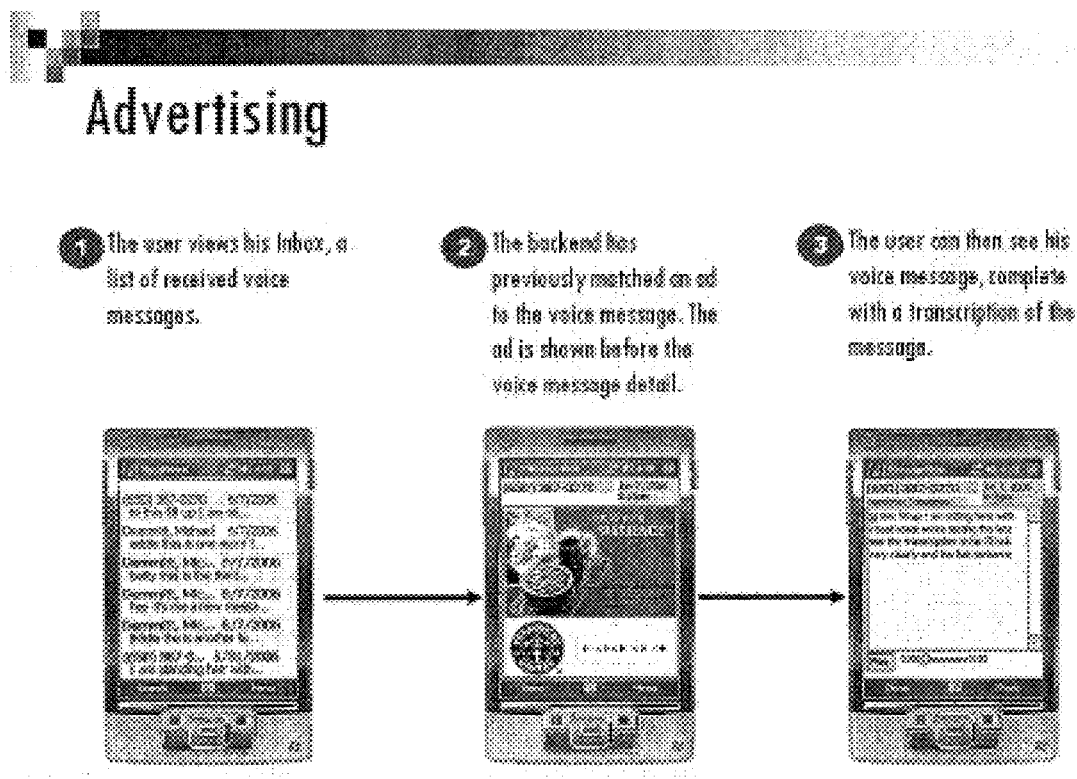
FIG. 3 is a schematic diagram of an embodiment using advertising.

Please see FIG. 3, Advertising Inserted Before Viewing An Individual Voice Message, for a graphical representation of one possible implementation of such an advertising method.

3.1.4.1. Ability to View Shown Ad By Clicking Link on Individual Voicemail View A system embodiment may provide a method for the user to retrieve an advertisement shown prior to viewing the voicemail message view. The user may be able to click on a link to display the advertisement.

3.1.2.2 Ability to View Previous Ads Via Advertising Inbox

A system embodiment may provide an approach for the user to access an advertisement previously displayed. The user may be able to click on a link to view a list of previously-displayed advertisements, for example. The user may select one of the advertisements from the list. If selected, a system embodiment may display the advertisement.

3.2. Advertisements on Responses from Recipients to Senders (VoiceReply)

A system embodiment may include advertisements with responses from recipients of voicemail messages to the sender of the message.

3.2.1. Embodiment: Include Advertisements on VoiceReply Responses

One possible embodiment of such a system embodiment may include an advertisement on messages sent as a response to a sender of voicemail. The sender may receive both the response and the associated advertisement.

3.3. Advertisements on Messages Initiated by Users (VoiceNotes)

A system embodiment may include advertisements on messages initiated by users to specified recipients.

3.3.1. Embodiment: Include Advertisements on VoiceNotes

One possible embodiment of such a system embodiment may include an advertisement on messages sent as a VoiceNote to one or more recipients. The recipient may receive both the sent message and the associated advertisement.

3.4. Format of Advertising

The advertising shown may be in any number of different formats. Formats may be selected based on the handset or other similar device's capabilities. The same handset or other similar device may also display different formats.

3.4.1. Video

A system embodiment may support video as an advertisement format. Advertisements may be received and displayed in any of several possible video formats.

3.4.2. Rich Media

A system embodiment may support rich media as an advertisement format. Advertisements may be received and displayed in any of several possible formats which are interactive and/or allow motion or other actions.

3.4.2.1. Embodiment: Flash-Style Advertisements

One possible embodiment of a system embodiment may support rich media through the support of Flash. Advertisements may be received as Flash files, and displayed through the invocation of a Flash player resident on the handset or other similar device, or downloaded and installed as part of download and installation.

3.4.3. Coupons

A system embodiment may support coupons as an advertisement format. Advertisements may be received and displayed in any of several possible formats which are redeemable at the advertising merchant location or through other methods of purchase. These types of advertisements may include a redemption code or other method to identify the offer.

3.4.4. Images

A system embodiment may support images as an advertisement format. Advertisements may be received and displayed in any of several possible image formats which are supported by the user's handset or other similar device.

3.4.5. Text

A system embodiment may support text as an advertisement format. Advertisements may be received and displayed in any of several possible text formats.

3.5. User Response Mechanisms to Advertisements

Users may have various mechanisms available to respond to a displayed advertisement.

3.5.1. Click-To-Call

A system embodiment may provide the ability to click on a telephone number and/or link embedded within an advertisement and may have the user's handset or similar device call that number.

3.6. Untargeted Advertising

A system embodiment may have the ability to display advertisements that are not selected on the basis of any user or environmental factors.

3.7. Targeted Advertising

A system embodiment may have the ability to select advertisements based on a single factor or combination of factors. These are factors may be derived from the message, message transcription, user, environment or any other source.

3.7.1. Message-Specific Factors

One set of factors that may be used for selecting advertisements are factors that are specific to the received message.

3.7.1.1. Content of Voicemail

A system embodiment may use the content and the words inside of a voicemail message as factors in the selection of an advertisement to display. The content itself or factors derived from the content may be used to select advertisements.

3.7.1.1.1. Select Advertisements Based on Keywords in Voicemail Transcription One possible embodiment of this system embodiment may extract keywords from the transcription of the message and use those keywords to select advertisements. Advertisements may have a set of related keywords associated with them. A system embodiment may attempt to match keywords associated with the message and keywords associated with the advertisement to determine a match. The advertisement with a match based on a measurement of the quality of the match, for example, may be selected and sent to the handset or other device along with the voicemail message. If the user selected that particular voicemail for display, the handset or other similar device may show them the selected advertisement before displaying the content of the message.

3.7.1.1.1.1. Embodiment: Advertisements Based on Keywords in Voicemail Transcription Here is an example of a possible system embodiment implementation: Someone leaves a user a message that mentions they want to have a Papaya Smoothie. The message transcription contains the keywords "Papaya" and "Smoothie." These keywords match advertisements related to smoothies. One of these ads, in this case a smoothie shop ad, gets shown to the user.

3.7.1.1.2. Select Advertisements Based on Concepts Extracted from Voicemail Transcription One possible embodiment of this system embodiment may extract the concepts from the transcription of the message and use those concepts to select advertisements. A concept is above the level of an individual word or phrase and represents an idea, place, or person that may be represented by any number of individual words or phrases. Advertisements may have a set of related concepts associated with them. A system embodiment may attempt to match the concepts associated with the message and the concepts associated with the advertisement to determine a match. The advertisement with a match, again based on a measurement of the quality of the match, for example, may be selected and sent to the handset or other device along with the voicemail message. If the user selected that particular voicemail for display, the device may show them the selected advertisement before displaying the content of the message.

3.7.1.1.2.1. Embodiment: Select Advertisements Based on Concepts Extracted from Voicemail Transcription Here is an example of a possible system embodiment implementation: Someone leaves a user a message that mentions the keywords "trail," "boots" and "tent." These keywords are mapped to the concept of outdoors and camping. These concepts match advertisements related to stores that sell camping supplies. One of these ads, in this case Ed's Camping Supplies, gets shown to the user.

3.7.1.1.3. Select Advertisements Based on Profile of Message

One possible embodiment of this system embodiment may determine which known profile a message belonged to and may use that profile to select advertisements. A profile may comprise an archetype or schema for a message, and messages with similar profiles may be inferred to refer to similar communications. For example, it may be determined that a certain combination of words around 6 pm usually indicates dinner plans. That combination of words and time may thus become a profile, which may comprise a signature for a type of message. Advertisements may have a set of related message profiles associated with them. A system embodiment may attempt to match the profile associated with the message and the profile associated with the advertisement to determine a match. The advertisement with a match, again, based on a quality measure, for example, may be selected and sent to the handset or other device along with the voicemail message. IF the user selected that particular voicemail for display, the handset or other similar device may show them the selected advertisement before displaying the content of the message.

3.7.1.1.3.1. Embodiment: Select Advertisements Based on Profile of Message Here is an example of a possible system embodiment implementation: Someone leaves a user a short message at 6 pm on Valentine's day that mentions the keywords "movie" and "dinner." This combination of keywords, date and time are mapped to the concept of "romance." This concept matches advertisements for florists. One of these ads for florists, gets shown to the user.

3.7.1.2. Sender of Message

A system embodiment may use the sender of a voicemail message as a factor in the selection of an advertisement to display. The sender or factors derived from the sender and/or his or her preferences and/or his or her relationship with the recipient(s) may be used to select advertisements.

3.7.1.2.1. Embodiment: Infer Relationship with Sender Based on Calling Profile One possible embodiment of this system embodiment may infer the relationship between the sender and the recipient based on the calling profile between the sender and the recipient. For example, a frequently called person by a user may be inferred to be close to that person, such as a significant other. Advertisements may have a set of related relationships associated with them. A system embodiment may attempt to match the relationship associated with the sender and the relationship associated with the advertisement to determine a match. The advertisement with a quality match may be selected and sent to the handset or other device along with the voicemail message. If the user selected that particular voicemail for display, the handset or other similar device may show them the selected advertisement before displaying the content of the message.

This mechanism may be combined with other known data, for example, holidays such as Valentine's Day. One example of targeting may display an ad for a romantic dinner for two if that special person called on that day, while displaying normally-selected ads for other callers.

3.7.1.2.2. Embodiment: Infer Relationship with Sender Based on Recipient's Address Book One possible embodiment of this system embodiment may infer the relationship between the sender and the recipient based on the recipient's handset or other address book. For example, the sender's position in the user's speed dial list of numbers may be used to infer the level of the relationship between recipient and sender. Advertisements may have a set of related relationship levels associated with them. A system embodiment may attempt to match the relationship level associated with the sender and the relationship level associated with the advertisement to determine a match. The advertisement with a quality match may be selected and sent to the handset or other similar device along with the voicemail message. If the user selected that particular voicemail for display, the handset or other similar device may show them the selected advertisement before displaying the content of the message, for example.

3.7.1.2.3. Embodiment: Target Advertising Based on Sender's Preferences

One possible embodiment of this system embodiment may infer the preferences of the recipient based on the preferences of the sender, if the sender's preferences were already available to a system embodiment. For example, if a system embodiment recognizes that a sender had a preference for a certain type of meal, based on the senders advertising profile, a system embodiment may infer that recipients of that particular sender's messages may also have a similar preference for that certain type of meal. Advertisements may be targeted on that preference. A system embodiment may attempt to match the implied preference associated with the sender and the preference associated with an advertisement to determine a match. The advertisement with a quality match may be selected and sent to the handset or other similar device along with the voicemail message. If the user selected that particular voicemail for display, the handset or other similar device may show them the selected advertisement before displaying the content of the message, for example.

3.7.1.3. Time of Day

A system embodiment may use the current time of day that the voicemail was sent as a factor in the selection of an advertisement to display. The time of day itself or factors derived from the time of day may be used to select advertisements.

3.7.1.3.1. Embodiment: Infer Intent of Voicemail Through Time of Day Received One possible embodiment of this system embodiment may infer the intent of the voicemail on the basis of the time of day it was sent and use that inferred intent to select advertisements. Advertisements may have a set of related intent profiles associated with them. A system embodiment may attempt to match the intent associated with the message and the intent associated with the advertisement to determine a match. The advertisement with a quality match may be selected and sent to the handset or other similar device along with the voicemail message. If the user selected that particular voicemail for display, the handset or other similar device may show them the selected advertisement before displaying the content of the message. For example, a voicemail sent around lunchtime may be associated with an advertisement for a restaurant.

3.7.1.4. Location

A system embodiment may infer a location from the content of the message. The location itself or factors derived from the location may be used to select advertisements.

3.7.1.4.1. Embodiment: Infer Location from Voicemail Content

One possible embodiment of this system embodiment may extract location information from the content of the message to select advertisements. For example, the voicemail may contain the phrase "meet in Palo Alto", which a system embodiment may extract and identify as the city of Palo Alto, Calif. Advertisements may have a set of related locations associated with them. A system embodiment may attempt to match the locations associated with the message and the locations associated with the advertisement to determine a match. The advertisement with a quality match may be selected and sent to the handset or similar device along with the voicemail message. If the user selected that particular voicemail for display, the handset or other similar device may show them the selected advertisement before displaying the content of the message, for example.

3.7.2. User-Specific Factors

One set of factors that may be used for selecting advertisements are factors that are specific to the user or to their received message.

3.7.2.1. Calling Profile

A system embodiment may use the calling profile of a recipient of a voicemail message as a factor in the selection of an advertisement to display. The calling profile may be used to group related types of users together, or alternatively, to determine the demographic group(s) with which the user is associated. Such demographic groups may include one or more of, but are not limited to: occupation, gender, region, and age. Any single factor of or combination thereof of the group membership and/or demographic association(s) may be used to select advertisements.

3.7.2.1.1. Embodiment: Infer Demographic Group of Recipient Based on Mobile Usage Pattern One possible embodiment of this system embodiment may infer the demographic group(s) of the recipient based on the calling profile of the recipient. For example, a recipient who calls frequently at night may have a higher likelihood of being a younger individual than someone who call during the morning and early afternoon. If so, advertisements may have a set of related demographic group(s) associated with them. A system embodiment may attempt to match the demographic group(s) associated with the recipient and the demographic group(s) associated with the advertisement to determine a match. The advertisement with a quality match may be selected and sent to the handset or similar device along with the voicemail message. If the user selected that particular voicemail for display, the handset or other similar device may show them the selected advertisement before displaying the content of the message, for example.

3.7.2.2. Profile from Carrier Records

A system embodiment may use the user profile from the carrier of a recipient of a voicemail message as a factor in the selection of an advertisement to display, assuming it is legally accessible. The data contained in the user profile may be used to select the advertisement to display, or may be used to identify which demographic or related group the user belongs to, and that group membership may be used to select the advertisement. Such demographic groups may include one or more of, but are not limited to: occupation, gender, region, and age. Any single factor of or combination thereof of the group membership and/or demographic association(s) may be used to select advertisements.

3.7.2.2.1. Embodiment: Target Advertising Based on Recipient's Customer Record with Carrier One possible embodiment of this system embodiment may infer the demographic group(s) of the recipient based on the user record and profile of the recipient stored on the carrier system embodiment. For example, the user record maintained by the carrier may store the recipient's age, from which a system embodiment may infer a demographic group. Advertisements may have a set of related demographic group(s) associated with them. A system embodiment may attempt to match the demographic group(s) associated with the recipient and the demographic group(s) associated with the advertisement to determine a match. The advertisement with a quality match may be selected and sent to the handset or other similar device along with the voicemail message. If the user selected that particular voicemail for display, the handset or similar device first show them the selected advertisement before displaying the content of the message, for example.

3.7.2.3. Historical Response

A system embodiment may use the historical responses of the recipient to previously displayed advertisements as a factor in the selection of an advertisement to display. This data may be used to create a profile of preferences for the recipient. The data in the profile may be used to select the advertisement to display, or may be used to identify which demographic or related group the user belongs to, and that group membership may be used to select the advertisement. Such demographic groups may include, but are not limited to, one or more of: occupation, gender, region, and age. Any single factor of or combination thereof of the preferences, group membership and/or demographic association(s) may be used to select advertisements.

3.7.2.3.1. Embodiment: Target Advertising Based on Recipient's Response to Earlier Ads One possible embodiment of this system embodiment may store that a particular advertisement was shown to a user and may record whether or not that advertisement generated a response. This historical information may be used to select advertisements, or to infer the demographic group(s) of the recipient and use that inferred demographic group(s) to select advertisements. For example, a system embodiment may infer that a particular user is female based on the user's historical responses to advertisements oriented towards females. Advertisements may have a set of related demographic group(s) associated with them. A system embodiment may attempt to match the demographic group(s) associated with the recipient and the demographic group(s) associated with the advertisement to determine a match. Alternatively, advertisements may be selected on the basis of whether the user has historically responded to advertisements of that type. If the user has historically not responded to a specific advertisement or type of advertisement, that particular advertisement or type of advertisement is not selected. If the user has historically responded, the advertisement is selected. A combination of historical response and demographic group(s) may also be used; for example, to narrow the range of advertisements that may be matched against. The advertisement with a quality match may be selected and sent to the handset or similar device along with the voicemail message. If the user selected that particular voicemail for display, the handset or similar device may show them the selected advertisement before displaying the content of the message, for example.

3.7.3. Environmental Factors

A system embodiment may use factors that are not specific to the user, but instead are specific to their current environment, such as time of day or location, to select advertisements.

3.7.3.1. Location

A system embodiment may use the current location of the user as a factor in the selection of an advertisement to display. The location itself or factors derived from the location may be used to select advertisements.

3.7.3.1.1. Embodiment: Use Connected Cell Tower as a Proxy for Location

One possible embodiment of this system embodiment may use the cell tower to which the handset or other similar device was currently coupled as a proxy for the current location of the recipient. A system embodiment may use the derived location to select advertisements. Advertisements may have a set of related locations associated with them. A system embodiment may attempt to match the locations associated with the message and the locations associated with the advertisement to determine a match. The advertisement with a quality match may be selected and sent to the handset or other similar device along with the voicemail message. If the user selected that particular voicemail for display, the handset or other device may show them the selected advertisement before displaying the content of the message, for example.

3.7.3.1.2. Embodiment: Select Ads for Display Based Upon or Soon After Recipient's Current Location One possible embodiment of this system embodiment may use the current location of the user from the handset or other similar device to select advertisements. Advertisements may have a set of related locations associated with them. A system embodiment may attempt to match the locations associated with the message and the locations associated with the advertisement to determine a match. The advertisement with a quality match may be selected and sent to the handset or other similar device along with the voicemail message. If the user selected that particular voicemail for display, the handset or similar device may show them the selected advertisement before displaying the content of the message, for example.

3.7.3.2. Time of Day

A system embodiment may use the current time of day of the user as a factor(s) in the selection of an advertisement to display. The time of day itself or factors derived from the time of day may be used to select advertisements.

3.7.3.2.1. Embodiment: Infer Intent of Voicemail Through Time of Day Received One possible embodiment of this system embodiment may infer the intent of the user on the basis on the current time of day and use that inferred intent to select advertisements. For example, a system embodiment may infer that the user may be hungry at 6 pm and may be interested in receiving an advertisement related to dinner. Advertisements may have a set of related intent profiles associated with them. A system embodiment may attempt to match the intent associated with the message and the intent associated with the advertisement to determine a match. The advertisement with the best match may be selected and sent to the handset or other similar device along with the voicemail message. If the user selected that particular voicemail for display, the handset or other similar device may show them the selected advertisement before displaying the content of the message, for example.

3.7.4. Use of Multiple Factors in Targeting Advertisements

A system embodiment may more than one factor, and of various factor types, to select advertisements.

3.7.4.1. Embodiment: Combining User-Specific with Environmental Factors to Increase Ad Effectiveness One possible embodiment of this system embodiment may combine user-specific factors with environmental factors to select advertisements. Advertisements may have a set of related factors associated with them, and a weight for a factor. For example, a pool hall advertisement may weight the keywords "pool" and "bar" along with evening message times, messages between friends and a male demographic. A system embodiment may attempt to match the factors listed with the advertisement and the factors from the user and environment. Matching factors may be weighted appropriately to generate a weighted match score. The advertisement with a quality match may be selected and sent to the handset or other similar device along with the voicemail message. If the user selected that particular voicemail for display, the handset or other similar device may show them the selected advertisement before displaying the content of the message.

3.7.5. Improvements in Factor Identification and Accuracy

A system embodiment may contain processes to improve the identification and accuracy of the factors listed above.

3.7.5.1. Improve User Profile Demographics Through the Use of Surveys or Other Methods to Elicit Demographic Information A system embodiment may provide for user profile demographics to be more accurately defined through the use of surveys. A system embodiment may segment profiles based on collected data and other characteristics. However, this may identify what users are related and how, but without characteristics of their demographics. Surveys or other methods may be used to elicit demographic characteristics from a representative sample of users from a user segment identified. Other users in that segment may be inferred to have a similar demographic profile.

For example, a system embodiment may determine that two groups of users exist: one group that frequently receives calls in the morning and one that frequently receives calls at night. Further data may be provided via a survey. For example, a survey of the users asking them their job occupation may determine that the morning group are often businesspeople while the evening group are often young individuals with an active nightlife.

3.7.5.2. Improve Automatic Message Profiling Through Manual Message Profiling A system embodiment may provide for message profiles to be more accurately defined through the use of manual and/or automatic identification of message profiles. Incoming messages may be profiled by a system embodiment. Certain messages may be selected, by selecting those where the automatic profiling reached a less certain or no result.

Selected messages may be forwarded to manual profilers, who categorize the message. The categorized message may sent back to the main system embodiment. A system embodiment may use the manual data to train the automatic profiler to better profile messages.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. An apparatus comprising:
a mobile device comprising an integrated voicemail system in which visual display voicemail access capability is provided for the integrated voicemail system;
wherein the mobile device is adapted to transcribe voicemail messages to text messages and/or to forward voicemail messages to a server for transcription by the server.

2. The apparatus of claim 1, wherein the mobile device is further adapted to transcribe or forward voicemail messages for transcription based at least in part on transcription capability of the mobile device.

3. The apparatus of claim 1, wherein the server comprises a backend server.

4. The apparatus of claim 3, wherein the backend server comprises a message server.

5. The apparatus of claim 1, wherein the visual display voicemail access capability comprises a voicemail inbox.

6. The apparatus of claim 5, wherein the voicemail inbox further provides one or more visual voicemail status indicators.

7. The apparatus of claim 6, wherein the one or more visual voicemail status indicators include at least one of the following: time of call; date of call and/or caller.

8. The apparatus of claim 1, wherein the integrated voicemail system includes the capability to fast forward a voicemail.

9. The apparatus of claim 1, wherein the mobile device includes a touch screen display.

10. An apparatus comprising:
a mobile device comprising an integrated voicemail system in which visual display voicemail access capability is provided for the integrated voicemail system such that, via a voicemail inbox, more than one voicemail message is displayed at once, including one or more visual voicemail display indicators associated with the more than one voicemail messages displayed, and for at least some of the more than one voicemail messages displayed at least a portion of a text transcription, the one or more associated voicemail display indicators also being displayed at once via the voicemail inbox;
wherein the mobile device is adapted to receive and/or deliver one or more voicemails to a user via one or more of a plurality of message channels.

11. The apparatus of claim 10, wherein the plurality of message channels comprises at least one of the following: email, SMS, a pool of telephone numbers, a voicemail system, a website interface, or any combination thereof.

12. The apparatus of claim 10, wherein the integrated voicemail system includes the capability to fast forward a voicemail.

13. The apparatus of claim 10, wherein the one or more associated visual voicemail status indicators further include at least one of the following: time of call; date of call and/or caller.

14. The apparatus of claim 10, wherein the mobile device includes a touch screen display.

15. An apparatus comprising:
a mobile device comprising an integrated voicemail system in which visual display voicemail access capability is provided for the integrated voicemail system;
wherein the mobile device is adapted to record one or more voicenotes in order for the voicenotes to be transcribed to text messages by the mobile device locally and/or to be transcribed by a non-local server after being forward from the mobile device to the non-local server.

16. The apparatus of claim 15, wherein the mobile device is adapted to transmit the one or more voicenotes via one or more of a plurality of message channels.

17. The apparatus of claim 16, wherein the plurality of message channels comprises at least one of the following: email, SMS, a website interface, or any combination thereof.

18. The apparatus of claim 16, wherein the mobile device adapted to transmit the one or more voicenotes via one or more of a plurality of message channels being further adapted to transmit the one or more voicenotes to an identified group of recipients.

19. The apparatus of claim 15, wherein the integrated voicemail system includes the capability to fast forward a voicemail.

20. The apparatus of claim 15, wherein the visual display voicemail access capability comprises a voicemail inbox.

21. The apparatus of claim 20, wherein the voicemail inbox further provides a visual voicemail status indicator.

22. The apparatus of claim 21, wherein the visual voicemail status indicator further indicates at least one of the following: time of call; date of call and/or caller.

23. The apparatus of claim 15, wherein the mobile device further includes the capability to fast forward a voicemail or voicenote.

24. The apparatus of claim 15, wherein the mobile device includes a touch screen display.

\* \* \* \* \*

UNITED STATES PATENT AND TRADEMARK OFFICE
CERTIFICATE OF CORRECTION

PATENT NO. : 10,375,247 B2
APPLICATION NO. : 15/070671
DATED : August 6, 2019
INVENTOR(S) : Michael Demmitt et al.

Page 1 of 1

It is certified that error appears in the above-identified patent and that said Letters Patent is hereby corrected as shown below:

Column 30 In Claim 10, Line 22, after "associated" add --visual--.

Column 30 In Claim 13, Line 35, replace "status" with --display--.

Signed and Sealed this
Third Day of March, 2020

Andrei Iancu
*Director of the United States Patent and Trademark Office*